(12) United States Patent
Ault et al.

(10) Patent No.: US 6,976,260 B1
(45) Date of Patent: Dec. 13, 2005

(54) METHOD AND APPARATUS FOR SERIALIZING A MESSAGE QUEUE IN A MULTIPROCESSING ENVIRONMENT

(75) Inventors: Donald F. Ault, Poughkeepsie, NY (US); David R. Cardall, Saugerties, NY (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,903

(22) Filed: Sep. 24, 1999

(51) Int. Cl.[7] .............................................. G06F 3/00
(52) U.S. Cl. ....................................... 719/314; 710/54
(58) Field of Search ................................ 709/310, 250, 709/313, 314, 315; 710/56, 52, 112, 54; 719/314, 719/310, 315; 711/153

(56) References Cited

U.S. PATENT DOCUMENTS

| | | | |
|---|---|---|---|
| 4,658,351 A | 4/1987 | Teng | |
| 4,847,754 A | 7/1989 | Obermarck et al. | |
| 4,908,750 A | 3/1990 | Jablow | |
| 5,222,217 A * | 6/1993 | Blount et al. | 707/204 |
| 5,313,638 A | 5/1994 | Ogle et al. | |
| 5,333,269 A | 7/1994 | Calvignac et al. | |
| 5,371,850 A | 12/1994 | Belsan et al. | |
| 5,404,562 A | 4/1995 | Heller et al. | |
| 5,548,760 A | 8/1996 | Healey | |
| 5,577,211 A | 11/1996 | Annapareddy et al. | |
| 5,602,998 A * | 2/1997 | Alferness et al. | 712/225 |
| 5,841,973 A * | 11/1998 | Kessler et al. | 709/250 |
| 5,893,157 A | 4/1999 | Greenspan et al. | |
| 5,895,492 A | 4/1999 | Greenspan et al. | |
| 5,895,494 A | 4/1999 | Scalzi et al. | |
| 5,925,099 A * | 7/1999 | Futral et al. | 709/204 |
| 6,029,205 A * | 2/2000 | Alferness et al. | 709/310 |
| 6,058,389 A * | 5/2000 | Chandra et al. | 707/1 |
| 6,134,619 A * | 10/2000 | Futral et al. | 710/112 |

(Continued)

OTHER PUBLICATIONS

Lumetta et al. "Managing Concurrent Access for Shared Memory Active Messages" IEEE, 1998, pp. 272-278.*

(Continued)

*Primary Examiner*—St. John Courtenay, III
*Assistant Examiner*—Van Hoa Nguyen
(74) *Attorney, Agent, or Firm*—William A. Kinnaman, Jr.

(57) ABSTRACT

A single atomic instruction is used to change up to four disjoint areas in memory concurrently in an extended compare and swap operation, replacing traditional locks for serialization and providing recovery for all queue manipulations. Use count-based responsibility passing is employed so that any number of tasks can read the various message queue chains, concurrent with queue updates being made. A summary queue update sequence number is maintained to provide concurrent chain update detection, so that any number of tasks can add elements to the end, or remove elements from the middle (i.e. any where in the chain) concurrently. Concurrent footprinting is used with chain manipulation, so that all (or none) of the chaining indicators and a footprint are set with a single, non-interruptible instruction, making it possible for recovery to always take the correct action. One such use of concurrent footprinting is the concurrent footprinting of use count changes, while another is the transfer of ownership of message queue control blocks. In a preferred embodiment on an IBM S/390 platform, the Perform Locked Operation (PLO) instruction is used to perform the extended compare and swap operations.

12 Claims, 40 Drawing Sheets

U.S. PATENT DOCUMENTS

| | | | |
|---|---|---|---|
| 6,247,064 B1 * | 6/2001 | Alferness et al. | 719/312 |
| 6,314,501 B1 * | 11/2001 | Gulick et al. | 711/153 |
| 6,345,327 B1 * | 2/2002 | Baskey et al. | 710/52 |
| 6,345,329 B1 * | 2/2002 | Baskey et al. | 710/56 |

OTHER PUBLICATIONS

IBM Publication entitled "Enterprise Systmes Architecture/390 Principles of Operation", Document No. SA22-7201-06 (Jul. 1999).

Article by W.R. Stevens entitled "UNIX Network Programming" (1990), pp. 137-152.

U.S. Appl. No. 09/040,722, filed Mar. 18, 1998 by D.F. Ault et al., and entitled "Method And Apparatus For Performing A Semaphore Operation".

U.S. Appl. No. 08/954,711, filed Oct. 20, 1997 by D.F. Ault et al., and entitled "Method And Apparatus For Allocating And Freeing Storage Utilizing Multiple Tiers Of Storage Allocation".

* cited by examiner

UNLOCK PLO COUNT > 1 - BEFORE

UNLOCK PLO CNT > 1 - AFTER

PLO CHAIN TO FRONT - BEFORE

PLO UNCHAIN ONLY ELEMENT - AFTER

METHOD AND APPARATUS FOR SERIALIZING A MESSAGE QUEUE IN A MULTIPROCESSING ENVIRONMENT

BACKGROUND OF THE INVENTION

1. Field of the Invention

This invention relates to a method and apparatus for manipulating a queue and, more particularly, to a method and apparatus for serializing a message queue in a multiprocessing environment without the use of a conventional lock or latch to control access to the message queue data structures.

2. Description of the Related Art

Digital computers generally have one or more user applications executing under the general supervisory control of an operating system (OS) kernel. Each user application, which may be running concurrently with other user applications, constitutes a separate process having its own address space and its share of system resources. Interprocess communication (IPC) mechanisms are a set of programming mechanisms that allow different processes to intercommunicate and coordinate their use of shared resources. One such mechanism is the semaphore, described in the commonly owned, copending application of applicant D. F. Ault et al., Ser. No. 09/040,722, filed Mar. 18, 1998, entitled "Method and Apparatus for Performing a Semaphore Operation" and incorporated herein by reference. Another such mechanism is the message queue, described in such standard works as W. R. Stevens, UNIX Network Programming (1990), pages 126–137, incorporated herein by reference.

Although the present invention is not limited to UNIX implementations, the UNIX standards define functions for creating a message queue (msgget), sending a message (msgsnd) and receiving a message (msgrcv). The following is a brief summary of these message queue functions:

msgget( ): Requests that a message queue be defined. There are permission controls which allow the application to permit or prevent users from accessing the message queue.

msgsnd( ): Send a message to a queue. The message consists of a TYPE and a message. The TYPE field is an integer which can also be thought of as a priority. TYPE=1 would be the highest priority. All sent messages are added to the end of the message queue, so that the queue is ordered oldest to newest.

msgrcv( ): Receive a message. The caller specifies a TYPE as follows:
TYPE=0: Receive the oldest or first element on the message queue.
TYPE=n: Receive the first element on the message queue which has TYPE=n
TYPE=-n: Receive a message which has TYPE$\leq$n, which has the lowest TYPE value. In other words, receive the highest priority message on the message queue with TYPE$\leq$n.

Multiple user processes can be concurrently sending messages to the queue as well as receiving messages. The operating system kernel is responsible for controlling the access to the message queue and maintaining the integrity of the data. Most operating systems provide this control by defining a lock or latch which is obtained for all send and receive operations. U.S. Pat. No. 5,313,638 to Ogle et al., entitled "Method Using Semaphores for Synchronizing Communication Between Programs or Processes Resident in a Computer System", is one such implementation where the lock used is a semaphore.

The following flow shows how typical message queue operations are performed:

MSGSND: Send a message
1. Obtain a lock to serialize the message queue. If the lock is not available, suspend the caller until the lock is available.
2. Check if another task is waiting for a message in the msgrcv function. If there is a waiter, assign the message to that waiter and wake up the waiting task.
3. If there are no waiters for the message, then add the message to the end of the message queue.
4. Release the lock. This will wake up the next task waiting for the lock.

MSGRCV: Receive a message
1. Obtain a lock to serialize the message queue. If the lock is not available, suspend the caller until the lock is available.
2. Search the queue to locate a message which will satisfy the request. If a message is found, remove the message from the message queue and return the message to the caller. Release the lock. This will wake up the next task waiting for the lock.
3. If no message is found, create a queue element which identifies this task as waiting for a message. Release the lock and suspend the task. This process will be woken up by the processing defined in step 2 under msgsnd.
4. When the task is woken up, repeat at step 1.

In a system with hundreds or thousands of processes or threads requesting msgsnd and msgrcv against the same message queue, the lock requests can cause serious contention in the operating system and result in long response times or reduced transaction rates.

Another problem with the current art relates to error recovery. From a general recovery perspective, the current art tends to use one of two models. In one model, the system first sets a footprint indicating that a recoverable action is to be taken (step 1), then performs the recoverable action (step 2). In the other model, the system first performs the recoverable action (step 1), then sets a footprint indicating that a recoverable action has been taken (step 2).

To make this example more relevant to this discussion, assume the recoverable action is to add or remove an element from a message queue. This can involve updating multiple pointers in queue elements and queue anchor pointers. If an error (e.g. program check) occurs, recovery routines are passed control. The logic in the recovery routine for both of the above models is that if the footprint is set for a recoverable action then, then the routine performs a recovery action against that resource.

This leads to the dilemma of what to do when the error occurs in between steps 1 and 2 (in either model) or when the error occurs in the middle of the recoverable action. In particular, when modifying linked chains, an incorrect recovery action can result in a damaged chain which will prevent any future processing.

SUMMARY OF THE INVENTION

The present invention replaces traditional locks for serialization and provides recovery for all queue manipulations in such a way as to avoid the problems described in the background portion above.

The present invention preferably uses a single atomic instruction to perform an extended compare and swap operation in which up to four disjoint areas in memory (e.g. indicators of an element's position in a chain) are atomically changed. Although the invention is not limited to any particular hardware environment, a suitable such atomic instruction is the IBM S/390 instruction named Perform Locked Operation (PLO), described further below.

In its preferred form, the present invention also employs use count-based responsibility passing, so that any number of tasks can read the various message queue chains, concurrent with queue updates being made. This is supported by "remove-from-the-middle" updates (serialized by, for example, a separate unchaining PLO instruction), removing elements from the active chains, but instead of freeing them, leaving them on a "DEAD" chain until the use count goes to zero (i.e. last one to access queue must free all "DEAD" elements). This allows the original active chains to remain intact because the "DEAD" elements still retain their active chain next pointers, even though they are no longer on any active chain.

The present invention also preferably uses concurrent chain update detection. By maintaining a summary queue update sequence number, any number of tasks can add elements to the end, or remove elements from the middle (i.e. any where in the chain), concurrently. The queue update sequence number is incremented via a PLO instruction, for example, as part of every update made to any of the message queue chains. When used properly, this provides the ability to detect any chain updates (e.g., by causing a PLO collision) made by other threads, so that the current update activity can be aborted/retried using the latest chain management values.

The present invention uses concurrent footprinting with chain manipulation, so that all (or none) of the chaining indicators and a footprint are set with a single, non-interruptible instruction, making it possible for recovery to always take the correct action.

One such use of concurrent footprinting is the concurrent footprinting of use count changes. Since the modification of a use count is a recoverable action, an atomic instruction (e.g., PLO) is used to guarantee that recovery can always be performed to back out any use count changes. In a traditional environment two separate instructions would be used: one to atomically increment the use-count; and one to set a flag to inform the recovery environment that the use-count was incremented. Since asynchronous abends are possible (e.g. a CANCEL operator command) between any two instructions, there is the possibility that these two separate fields could get out of sync with one another, thereby not allowing the appropriate recovery to take place. If this occurs in this case the queue could become contaminated such that the use count would never go to zero. Since the atomic instruction allows discontiguous fields to be updated with a single non-interruptable instruction, these two fields can be known to be in sync when recovery is entered.

The present invention also uses concurrent footprinting in conjunction with floating control blocks. In this context, a floater is a small control block (MSQB) which floats in ownership between a msgrcv( ), msgsnd( ), msgctl( ) task or the message queue. Since ownership passing of these MSQBs is a recoverable action, the atomic instruction is used to make the ownership passing an atomic operation from a recovery perspective (e.g. either the msgsnd, or msgrcv owns it, never both).

An example of the ownership of an MSQB being passed would be when a sending task wants to assign/satisfy a pending receiving task's request. In this case the sending task would be the owner of the both the MSQB describing the data being sent and the data itself until the atomic instruction is performed to assign the MSQB to the receiver. This operation atomically (from both a multiprocessor and recovery point of view) clears the sending task's responsibility for the MSQB and sets the target task's ownership. Without the ability of atomically updating discontiguous areas in memory, no such responsibility passing could be reliably be performed from a recovery perspective. The MSQB and the data it represents could either be lost, or duplicately freed, depending upon how the interruptable multi-instruction solution was implemented.

These techniques are used to control four chains: (1) the message chain, which contains MSQBs that point to the message data; (2) the receiver chain, which contains MSQBs that describe tasks waiting for a message of the specified TYPE; (3) the sender chain, which contains MSQBs that describe tasks waiting for space to become available on the message queue; and (4) the dead chain, which contains MSQBs from the previous three chains, which cannot be deleted until the use count goes to zero.

The present invention implements locking by preventing deletions from the active chains until the last task out unlocks the chains and frees up any elements that are pending deletion. Thus, locking basically turns on responsibility passing without shutting down any of the operations. In contrast to conventional message queue implementations, the implementation of the present invention does not prohibit a task from performing a desired update against a queue due to an exclusive lock being held. The shared lock that is obtained just manages the administrative aspects of queue management (e.g., dead chain cleanup). This insures that the costs associated with waiting (i.e., suspending) a task due to a queue being busy are never incurred, thereby providing a superior message queue implementation.

DESCRIPTION OF THE PREFERRED EMBODIMENT

Introduction

Figure 11:
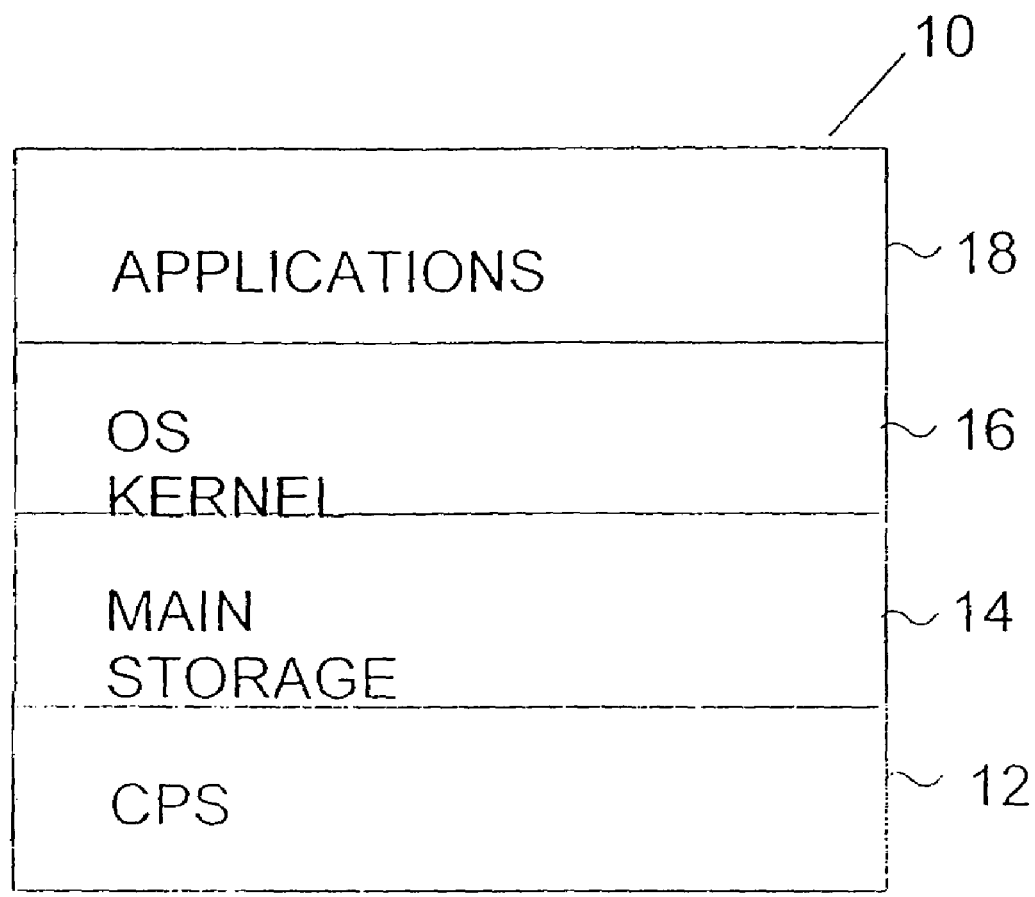
FIG. 11 shows an information handling system incorporating the present invention.

FIG. 11 shows an information handling system 10 incorporating the present invention. System 10 may comprise a hardware machine containing one or more central processors (CPs) 12 and main storage 14, together with various peripheral devices (such as disk storage) not separately shown.

Executing as programs on CPs 12 are an operating system (OS) kernel 16 and one or more user applications 18. System 10 may, for example, comprise any of the various models of the IBM S/390 Parallel Enterprise Server processor, while OS kernel 16 may comprise the IBM OS/390 operating system, with its UNIX System Services component providing standard UNIX functions such as the message queue functions described herein.

In the preferred embodiment, hardware machine 10 executes an instruction set defined in *Enterprise Systems Architecture/390 Principles of Operation*, IBM Publication SA22-7201-06 (July 1999), incorporated herein by reference. Of particular interest to the present invention is the instruction known as Perform Locked Operation (PLO).

Most computer systems contain hardware instructions which make it possible to perform atomic updates to system storage. Some of the previous instructions on the IBM S/390 hardware platform, as described in the above-identified Enterprise Systems Architecture/390 Principles of Operation, are Compare and Swap (CS), Compare Double and Swap (CDS), and Test and Set (TS). PLO (Perform Locked Operation) is a relatively new atomic instruction on S/390 hardware platforms. Whereas the atomic instructions listed above allow the atomic update of a single word or double word of storage, the PLO instruction allows the atomic update of multiple fields at disjoint locations in storage. The PLO instruction is described in the above-identified architecture publication, beginning at page 7–68, as well as in the following patents, incorporated herein by reference:

U.S. Pat. No. 5,893,157 to S. J. Greenspan et al., entitled "Blocking Symbol Control in a Computer System to Serialize Accessing a Data Resource by Simultaneous Processor Requests";

U.S. Pat. No. 5,895,492 to S. J. Greenspan et al., entitled "Processor Associated Blocking Symbol Controls for Serializing the Accessing of Data Resources in a Computer System";

U.S. Pat. No. 5,895,494 to C. A. Scalzi et al., entitled "Method of Executing Perform Locked Operation Instructions for Supporting Recovery of Data Consistency If Lost Due to Processor Failure, and a Method of Recovering the Data Consistency After Processor Failure";

The operation of the Perform Locked Operation (PLO) instruction will be summarized here for the convenience of the reader. The instruction has up to eight operands, as discussed below, and additionally uses the contents of two general registers (GRs)—general registers 0 and 1—that are associated with a particular CP 12 as described in the above-identified S/390 architecture publication. General register 0 stores a function code specifying the particular PLO operation, while general register 1 stores a lock.

After the lock specified in general register 1 has been obtained, the operation specified by the function code in general register 0 is performed. The function code can specify any of six operations: compare and load, compare and swap, double compare and swap, compare and swap and store, compare and swap and double store, or compare and swap and triple store.

If compare and load is specified, the first operand comparison value and the second operand are compared. If they are equal, the fourth operand is placed in the third operand location. If the comparison indicates inequality, the second operand is placed in the first operand comparison value location as a new first operand comparison value.

If compare and swap is specified, the first operand comparison value and the second operand are compared. If they are equal, the first operand replacement value is stored at the second operand location. If the comparison indicates inequality, the second operand is placed in the first operand comparison value location as a new first operand comparison value.

If double compare and swap is specified, the first operand comparison value and the second operand are compared. If they are equal, the third operand comparison value and the fourth operand are compared. If both comparisons indicate equality, the first operand and third operand replacement values are stored at the second operand location and fourth operand location, respectively. If the first comparison indicates inequality, the second operand is placed in the first operand comparison value location as a new first operand comparison value. If the first comparison indicates equality but the second does not, the fourth operand is placed in the third operand comparison value location as a new third operand comparison value.

If compare and swap and store, double store, or triple store is specified, the first operand comparison value and the second operand are compared. If they are equal, the first operand replacement value is stored at the second operand location, and the third operand is stored at the fourth operand location. Then, if the operation is the double store or triple store operation, the fifth operand is stored at the sixth operand location, and, if it is the triple store operation, the seventh operand is stored at the eighth operand location. If the first operand comparison indicates inequality, the second operand is placed in the first operand comparison value location as a new first operand comparison value.

After any of the six operations, the lock is released, and the result of the comparison or comparisons is indicated in the condition code.

Data Structures

FIGS. 1 through 4 show the primary data structures used in the preferred form of the present invention.

Figure 1:
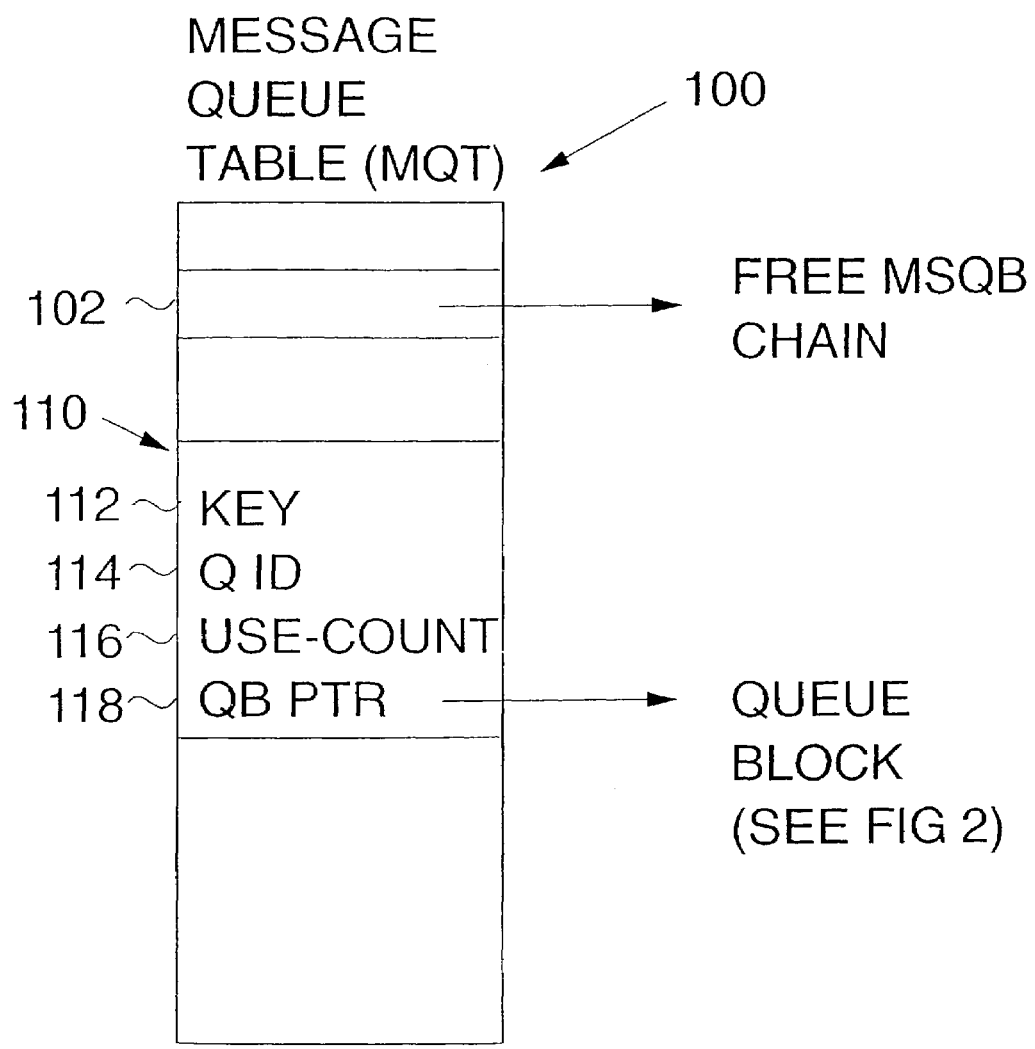
FIG. 1 shows the message queue table (MQT), which has an entry for each message queue.

FIG. 1 shows the Message Queue Table (MQT) 100. The main purpose of the MQT 100 is to provide the starting point for all message queue operations. When an application 18 does a msgget function call, the kernel 16 allocates an entry 110 in this table. Each entry records the key 112 passed by the caller of msgget and a unique message queue identifier 114 also referred to as a Q-ID. Each entry also contains the USE-COUNT 116 and a pointer to a Queue Block (QB) 118. All msgsnd and msgrcv operations pass in the Q-ID 114 as a means for the kernel 16 to quickly locate the entry in the MQT 100 and the QB pointer 118.

Figure 2:
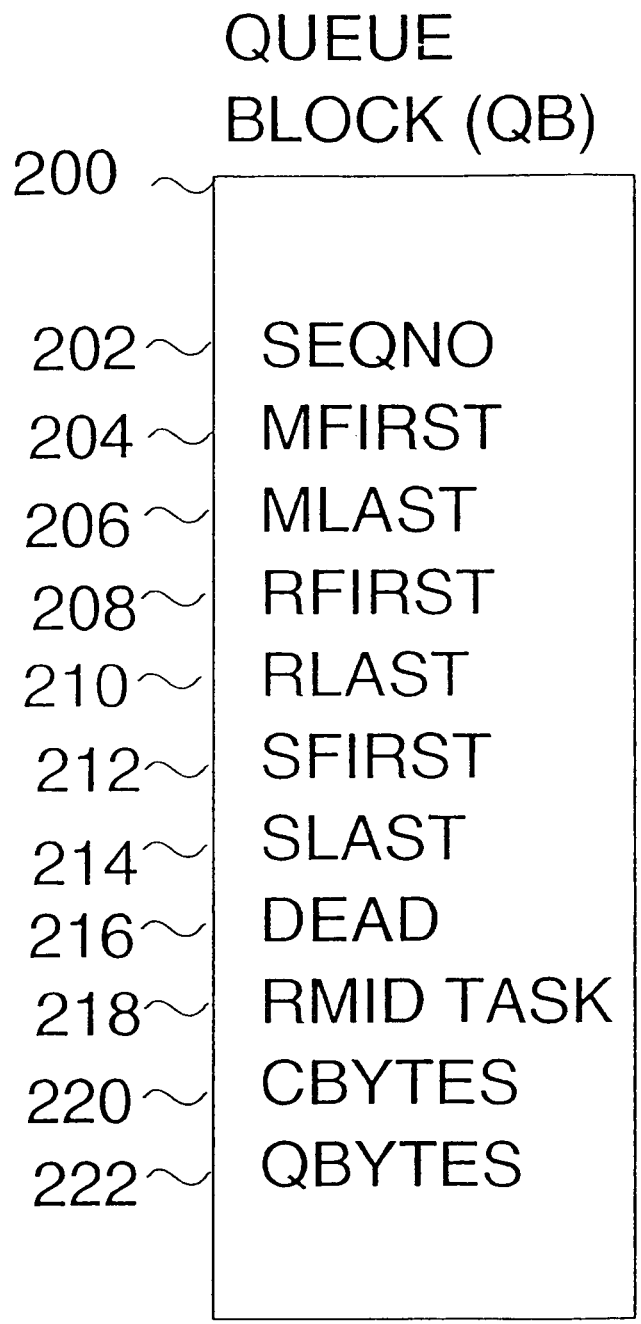
FIG. 2 shows the Queue Block (QB) used to keep track of a single message queue.

FIG. 2 shows the Queue Block (QB) 200. There is one QB 200 for each message queue defined to the system. The sequence number 202 field is atomically incremented via a PLO operation as part of every update made to any of the message queue chains. This provides the ability to detect any chain updates (by causing a PLO collision) made by other tasks, so that the current update activity can be aborted/retried using the latest chain management values.

The QB 200 also contains the following chain management fields:
  A pointer to the head of the message chain (MFIRST 204).
    A message is placed on the message chain when there is no receiver waiting to take it.
  A pointer to the end of the message chain (MLAST 206)
  A pointer to the head of the receiver chain (RFIRST 208).
    A receiver is placed on the receive chain when there is no message available for it to receive.
  A pointer to the end of the receiver chain (RLAST 210)
  A pointer to the head of the sender chain (SFIRST 212).
    A sender is placed on the send chain when there is insufficient space for the kernel 16 to store the message.
  A pointer to the end of the sender chain (SLAST 214)
  A pointer to the front of the dead chain (DEAD 216)
  The thread id of the task doing a remove id on the message queue (RMID 218)
  The number of messages on the message queue (CBYTES 220)
  The number of data bytes currently consumed by messages on the message queue (QBYTES 222)

Figure 3:
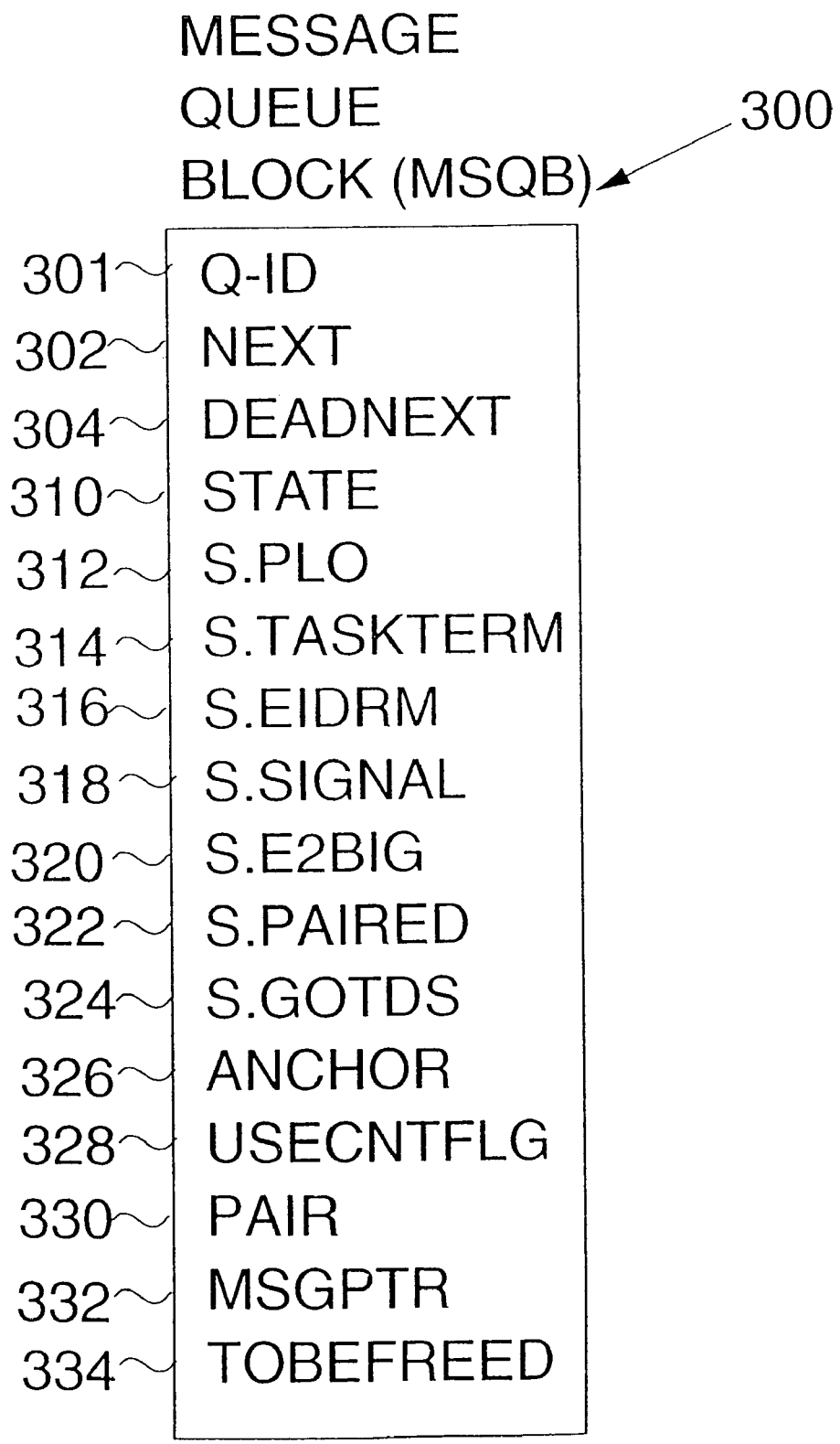
FIG. 3 shows the structure of a Message Queue Block (MSQB), which is used to track a message on the queue, a message sender, or message receiver.

FIG. 3 shows a Message Queue Block (MSQB 300). A MSQB is created for each caller of message send, message receive, and for each message. The MSQB is the control block used to keep track of a thread's activity with respect to a message queue (and accordingly plays a large role in the recovery processing). The fields in the MSQB 300 are:
  The Q-ID 301 identifies which message queue QB is being processed
  The NEXT 302 pointer is used for chaining MSQBs on receive, sender and message chains
  The DEADNEXT 304 pointer is used for chaining MSQBs on the dead chain
  The STATE 310 is used to describe the state of the MSQB
  The S.PLO 312 field is the target of the PLO instruction when the state of a MSQB is changed (i.e., it contains the following state bits)
  The S.TASKTERM 314 flag is set when the task which owns the MSQB enters termination
  The S.EIDRM 316 flag is set when the message queue is being removed
  The S.SIGNAL 318 flag is set when a waiting sender or receiver is woken for a signal
  The S.E2BIG 320 flag is set when a receiver is woken for a message which did not fit in the buffer
  The S.PAIRED 322 flag is set when a message is paired to a receiver
  The S.GOTDS 324 flag is set when storage has been obtained for a message
  The ANCHOR 326 string is used to identify which chain the MSQB is on (sender, receiver, message or dead)
  The USECNTFLAG 328 is set when the PLO instruction incrementing the USE-COUNT is successful.
  The PAIR 330 field is used to contain the pointer to a MSQB for a message when it is paired to a message receiver.
  The MSGPTR 332 field is used to point to the storage for the actual message. This is only used in a MSQB for a message.
  The TOBEFREED 334 field is used to anchor the local dead chain once UNLOCK processing has taken responsibility for it.

Figure 4:
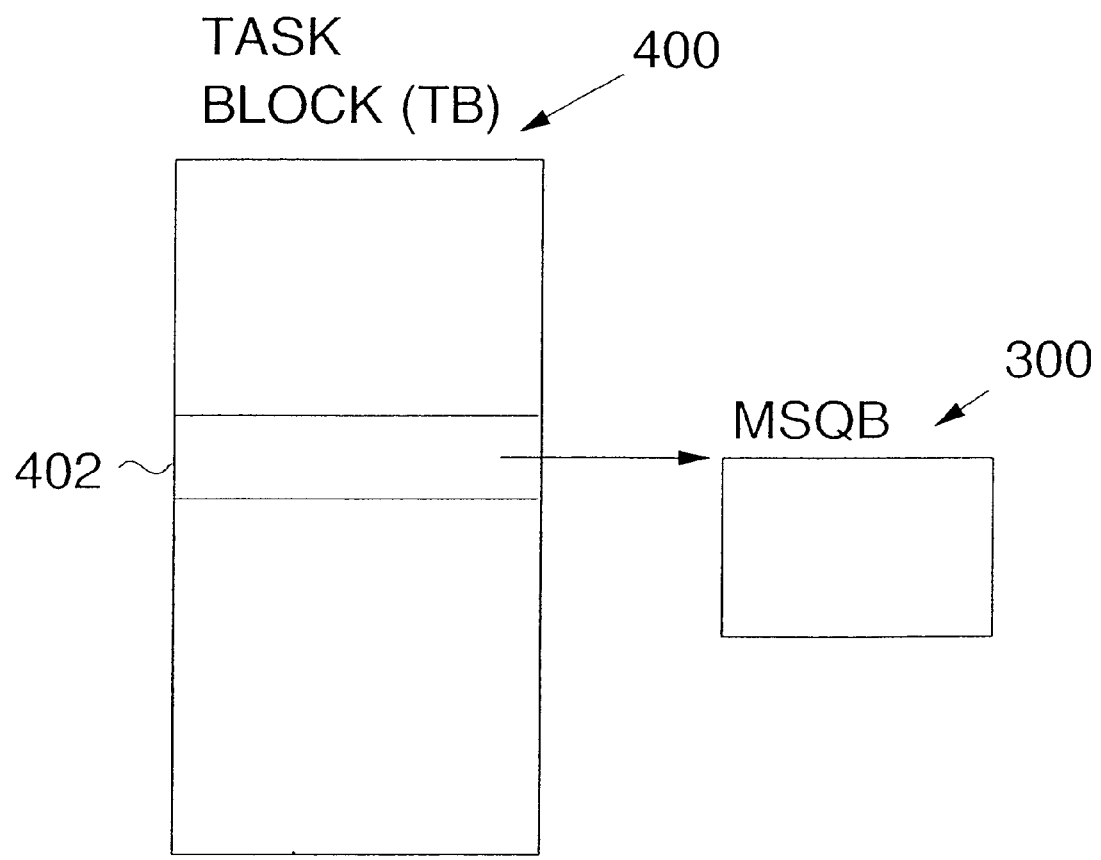
FIG. 4 shows a task block (TB), which becomes involved as the task calls msgsnd and msgrcv.

FIG. 4 shows a Task Block (TB 400). Each caller of message send or message receive has a TB representing their unit of work. There are many fields in the TB, but the only one of interest to the present invention is the pointer 402 to a MSQB 300 which is used for recovery purposes. This pointer 402 is set when the task is in message send or message receive processing.

All of the functions which operate on a message queue pass the Q-ID as a parameter. The Q-ID allows the message queue function to locate the control information 110 in the MQT 100.

Message Send (msgsnd)

Figure 5:
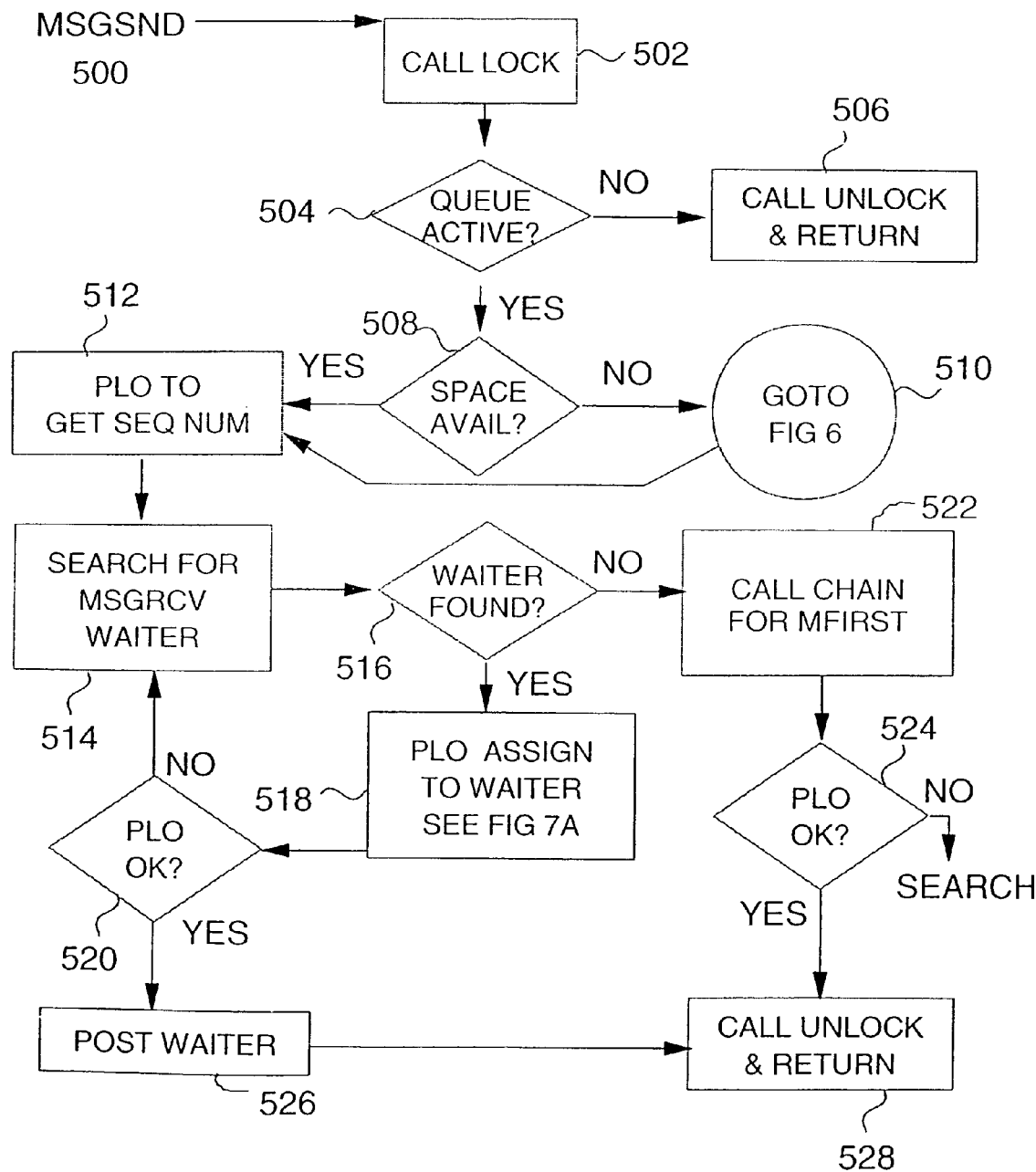
FIG. 5 shows the logic flow for a message send call.

FIG. 5 shows the high level logic of the msgsnd (message send) function. On entry, msgsnd calls the lock routine 502. The lock routine is described in FIG. 12. If the message queue is not active 504 then msgsnd calls unlock and returns 506. If the message queue is active 504 then msgsnd checks to see if the size of the message being sent can fit in the queue. This is done by atomically decrementing CBYTES 220 and QBYTES 222 by the appropriate values (i.e. via a Compare and Swap instruction) to determine the available space. If no space is available 508, then FIG. 6 describes the processing 510. Once space has been reserved 508, then the queue update sequence number (SEQNO) 202 is extracted in preparation for the subsequent adding of the message MSQB to the message chain (if required).

This extraction is done via a PLO instruction 512 to insure that any changes to the active chains can be detected by a PLO collision, so that the current update activity can be aborted/retried. Using a PLO instruction insures that the queue update sequence number (SEQNO) 202 is consistent with all the chain management fields at that instant (i.e. no other updates on this queue can be in progress while this PLO operation is active). This allows one to view the "Compare and Swap and up to triple store" PLO chaining operation as a single atomic operation, when in fact the updates are made sequentially in a non-atomic fashion, when viewed by a non-PLO primed task. This PLO operation performs no chain updates. Since summary information (i.e. the queue update sequence number) is being used as the PLO collision detection, PLO priming is used to ensure that the summary value is in fact consistent with the data that it is summarizing (i.e. the chain management fields). This PLO priming is used for all chain updates described in this specification.

Msgsnd then searches the message queue for a task waiting in msgrcv (message receive) 514. This search of the message queue can be done safely, since the queue was locked in step 502, which guarantees the integrity of the forward pointers of all of the chains. There are three types of search which can be performed, but this is not relevant to the present description. The search either finds a valid match for a task in message receive or it doesn't. If a msgrcv waiter is not found 516, then the chain routine is called 522 to add this message to the message chain. If the chain function was not successful 524, then flow returns to the search step 514. A failure in the chain function can be due to a new task adding itself to the chain of tasks waiting in msgrcv. By repeating the search, it prevents msgsnd from failing to wake up the a newly added msgrcv task (if appropriate). If the chain operation 522 was successful 524, msgsnd calls unlock and returns to the caller 528. If a receive waiter was found 516, then msgsnd does a PLO operation to assign the message being sent to the task waiting in msgrcv. This processing 518 is described in FIGS. 7A and 7B. If the PLO assignment operation fails, then flow returns to the search step 514. A failure in the PLO operation to pair the message to a receiver can be due to another task in msgsnd pairing its message to the same receiver. If the PLO operation to pair the message to a receiver is successful 520 then msgsnd POSTs (wakes up) 526 the task which was waiting in msgrcv (see step 924 in FIG. 9 for msgrcv). After POSTing the waiter, msgsnd calls unlock and returns to the caller 528.

Figure 6:
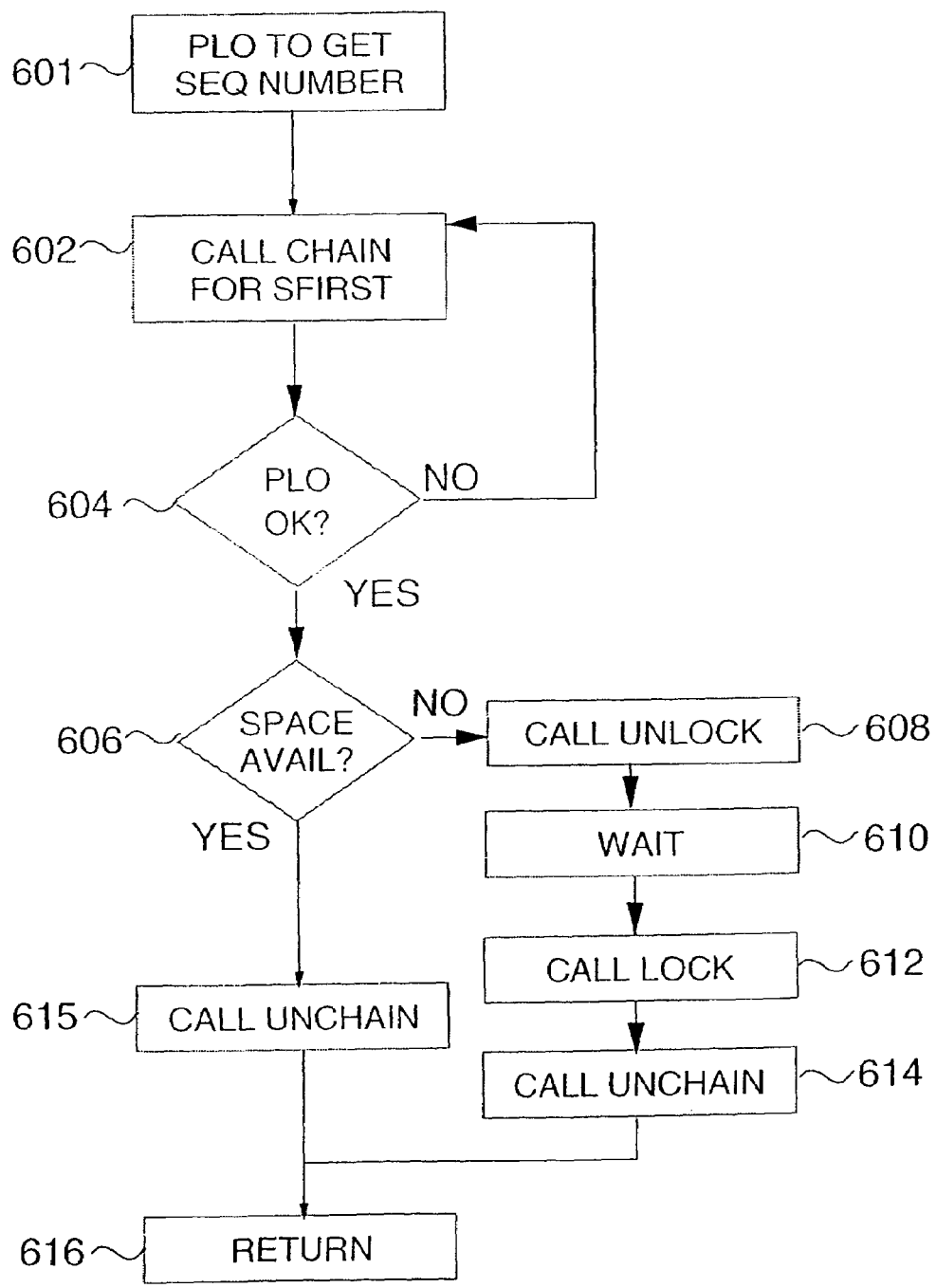
FIG. 6 shows the flow of a message send when there is no space to store the message.

FIG. 6 shows the processing which is done when there is not enough space in the message queue to store the message passed on msgsnd. Message queues are frequently defined with a limited amount of space to prevent a runaway caller from filling the system with messages. This routine first performs PLO sequence number priming 601 in preparation for adding the sender MSQB to the send waiter chain. It then calls the CHAIN service 602 to add the MSQB for the sender to the send waiter chain (SLAST 214). If the PLO operation in the CHAIN routine fails 604, then it repeats the chain attempt 602. When the CHAIN operation is successful 604, the available space is retested 606. By testing after the sender is added to the send chain, it closes a timing window where space has freed up on the message queue since it was tested in FIG. 5 step 508. If there is now space available, then call UNCHAIN 615 to remove the sender MSQB just added from the send waiter chain, and return 616. If there is still no space available 606, then UNLOCK is called 608 to decrement the use count on the message queue, and the caller of msgsnd is placed in a WAIT 610. As other msgrcv tasks consume message data, they free up space on the queue and then look for pending send waiters. If a sender is found, the msgrcv task reserves space on the queue for the sender, and POSTs the send waiter which causes it to resume execution. After waking, the first step is to lock 612 the message queue. Then UNCHAIN is called to remove the sender MSQB from the sender chain. This call to UNCHAIN specifies the sender chain header SFIRST 212 and the sender MSQB. Once complete, control is returned 616 to step 512 in FIG. 5. It should be noted that even though the sender MSQB has been removed from the sender chain, that it will not be freed until a subsequent UNLOCK is performed (i.e. the sender MSQB remains on the dead chain 216 until the UNLOCK USE-COUNT goes to zero).

Figure 7:
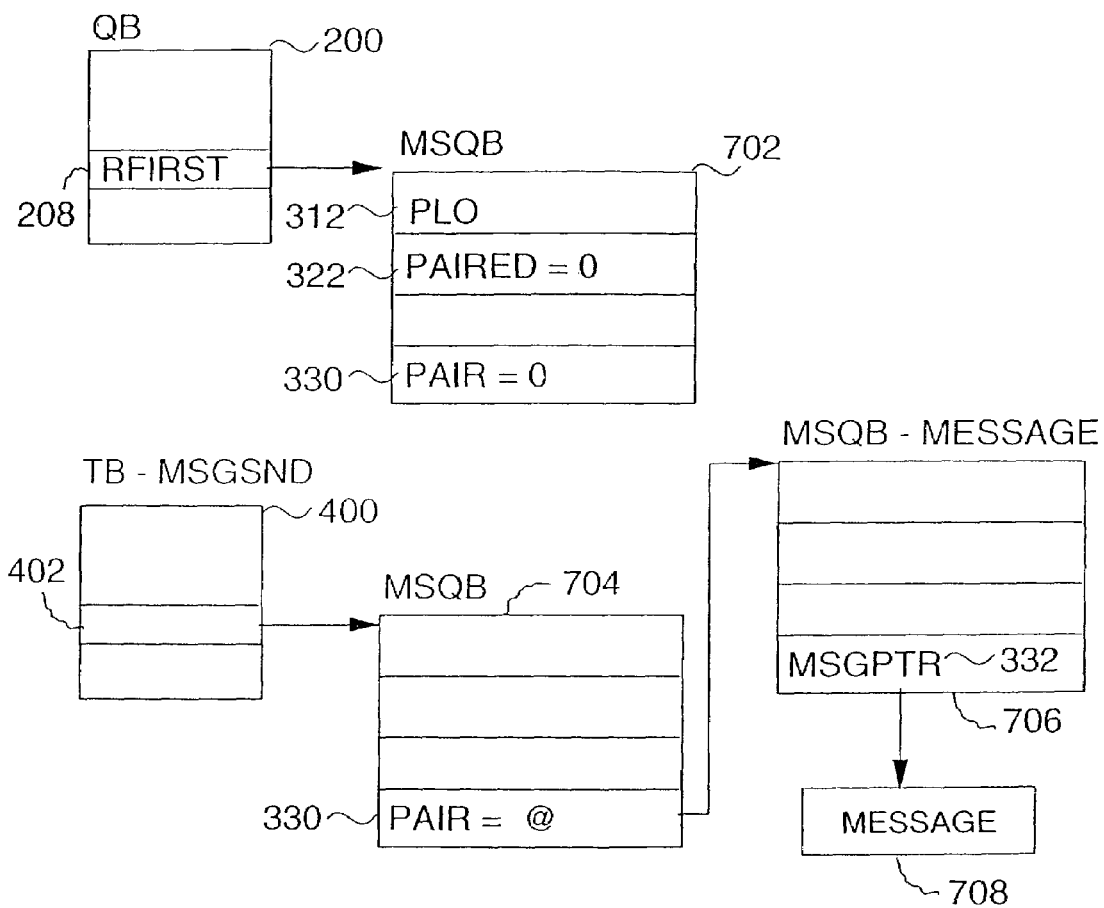
FIG. 7 shows the state of the data structures before the PLO instruction when assigning a message to a task waiting in message receive.
Figure 8:
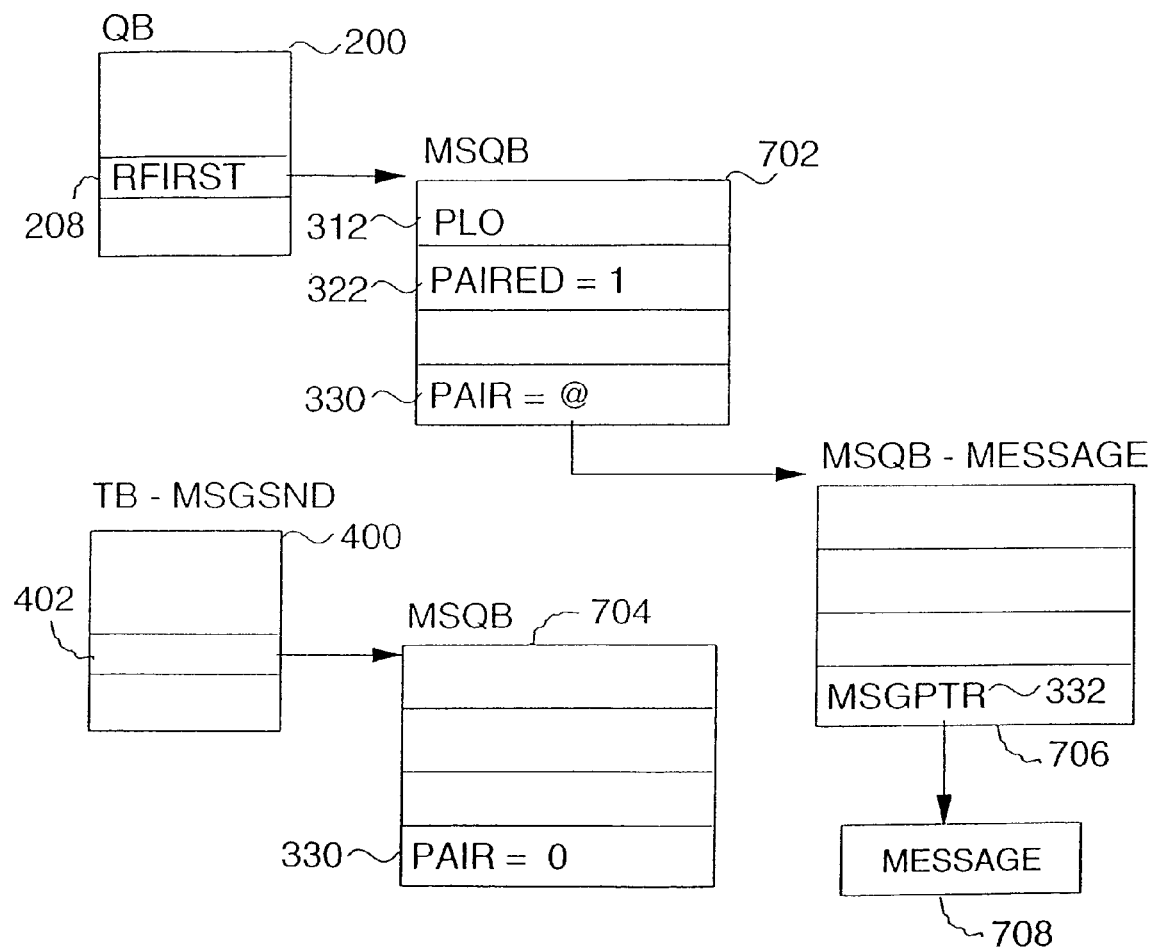
FIG. 8 shows the state of the data structures after the PLO instruction when assigning a message to a task waiting in message receive.

FIG. 7A shows the state of the message queue control blocks prior to the PLO operation which assigns the message being sent to a task waiting in msgrcv. Task Block (TB 400) represents the task sending the message. It currently points to MSQB 704 which has a pointer 330 which points to the MSQB 706 that describes the message. MSQB 706 has a pointer 332 which points to the actual message data 708. The Queue Block (QB 200) for this message queue has an RFIRST 208 pointer which is the anchor for the msgrcv MSQBs representing tasks waiting for a message. In this case MSQB 702 describes the message receiver that will be satisfied by the current message 708. The PLO operation is a compare and swap against the PLO field 312 in MSQB 702, and a double store operation targeting the MSQB field 330 in both MSQB 702 and MSQB 704. The compare and swap verifies that PLO field 312 is zero and then changes the PAIRED flag 322 to 1. This indicates that the task in msgrcv has a message paired to satisfy the request. The first store is to set the PAIR field 330 in MSQB 702 to the address of the MSQB 706 representing the message. The second store is to clear the PAIR field 330 in MSQB 704.

FIG. 7B shows the results of a successful PLO operation. The net effect of this PLO operation is to transfer the MSQB for the message from the sender to the receiver. Once the PLO operation completes, any errors (signals) on the sending or receiving task will result in the appropriate cleanup of the MSQBs.

Message Receive (msgrcv)

Figure 9:
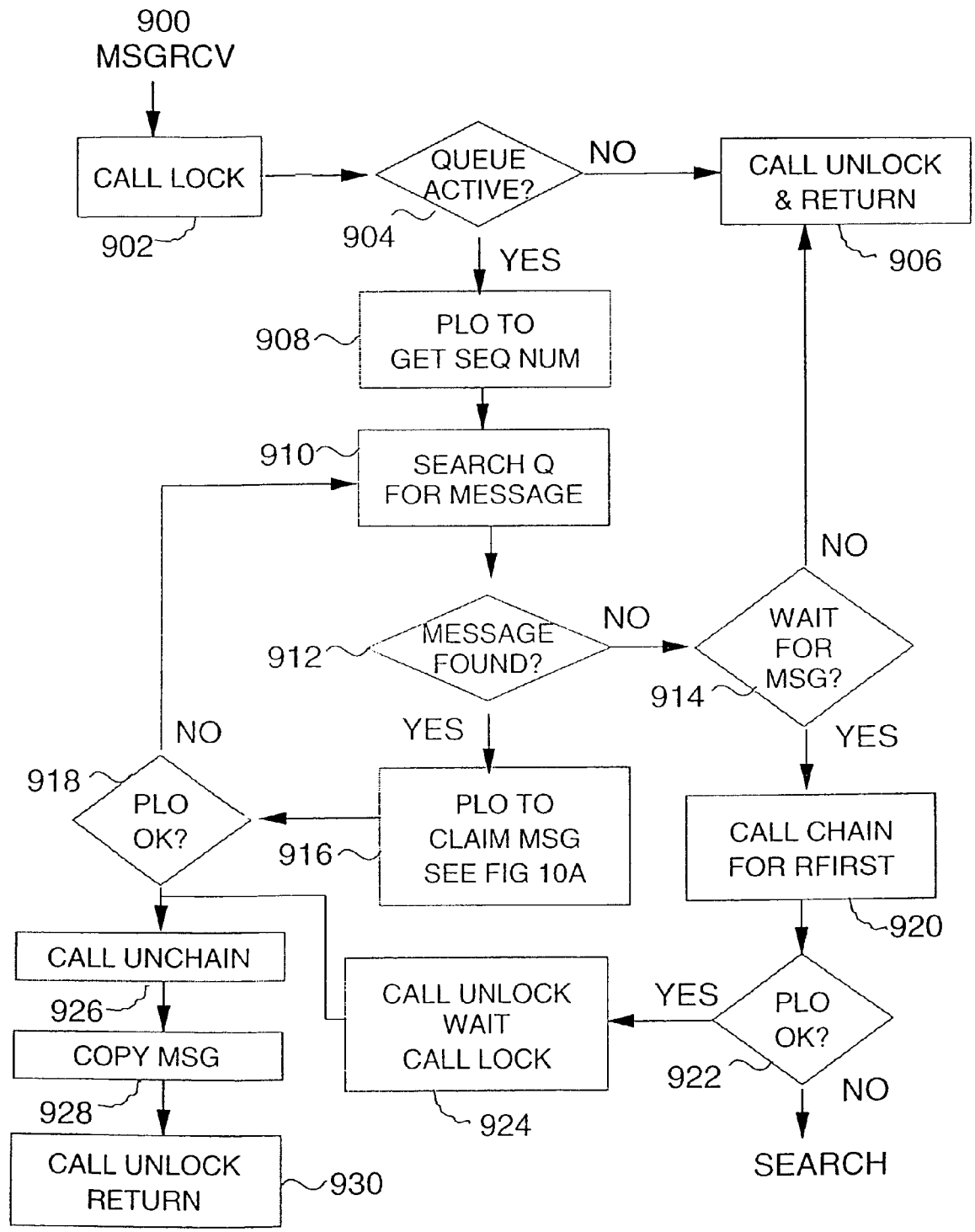
FIG. 9 shows the logic of a message receive.

FIG. 9 shows the high level processing for msgrcv (message receive) 900. The first step is for msgrcv to call LOCK 902 to increment the use count for the message queue. If the message queue is no longer active 904, then call UNLOCK 906 and return to the caller with a failing return code. If the message queue is still active 904, then perform PLO sequence number 202 priming 908 in preparation for adding the msgrcv MSQB to the receive waiter chain. The message chain is then searched 910 for a message to satisfy the request. The search algorithm implements the three types of processing described earlier, but is not relevant to this description. The search either finds an appropriate message or it doesn't. If a message is not found 912, then the request options are queried 914 to see if the caller of msgrcv wants to wait for a message. If the caller does not want to wait 914, then UNLOCK is called 906 and control is returned to the caller with a failure status. If the caller does want to wait 914, then the CHAIN routine is called 920 to add the MSQB for the caller to the receiver chain anchored by RFIRST 208. If the attempt to chain the receiver fails 922 due to a concurrent chain update (i.e. a new message was added to message chain), then the algorithm continues to search the chain for a good match 910. If the PLO operation to chain the MSQB is successful 922, then the UNLOCK routine is called and the task is placed in a WAIT 924. When a message becomes available, the msgsnd routine POSTS 526 this msgrcv waiter and wakes it up. Upon awakening, the msgrcv task calls LOCK 924 to increment the USE-COUNT for this message queue. UNCHAIN is then called 926 to remove the MSQB for the msgrcv caller from the receive chain. Finally, the message 708 is copied to the caller's storage. It should be noted that even though the receive MSQB has been removed from the receiver chain, that it will not be freed until a subsequent UNLOCK is performed.

Back at step 912, if a valid message was found on the queue, then a PLO instruction 916 (see FIGS. 10A and 10B) is done to pair the found message with this msgrcv task. If the PLO operation fails 918, then control returns to the search 910. The main reason for a failure is that another task in msgrcv paired this message first. If the PLO operation to pair the message is successful 918, then control flows to step 926. Since in this case msgrcv found the message on the message chain (vs. a msgrcv MSQB being paired via a msgsnd, as above), UNCHAIN 926 is called in to remove the message MSQB from the message chain. This call to UNCHAIN passes MFIRST 204 and the address of the message MSQB which was paired. After the MSQB for the message has been removed from the message chain, the content of the message 708 is copied to the caller's storage. It should be noted that even though the message MSQB has been removed from the message chain, that it will not be freed until a subsequent UNLOCK is performed (i.e. the message MSQB remains on the dead chain 216 until the UNLOCK USE-COUNT goes to zero). This allows the logic in msgrcv to continue to use the message MSQB while it is on the DEAD chain. The msgrcv function then calls UNLOCK 930 and returns to the caller.

Figure 10A:
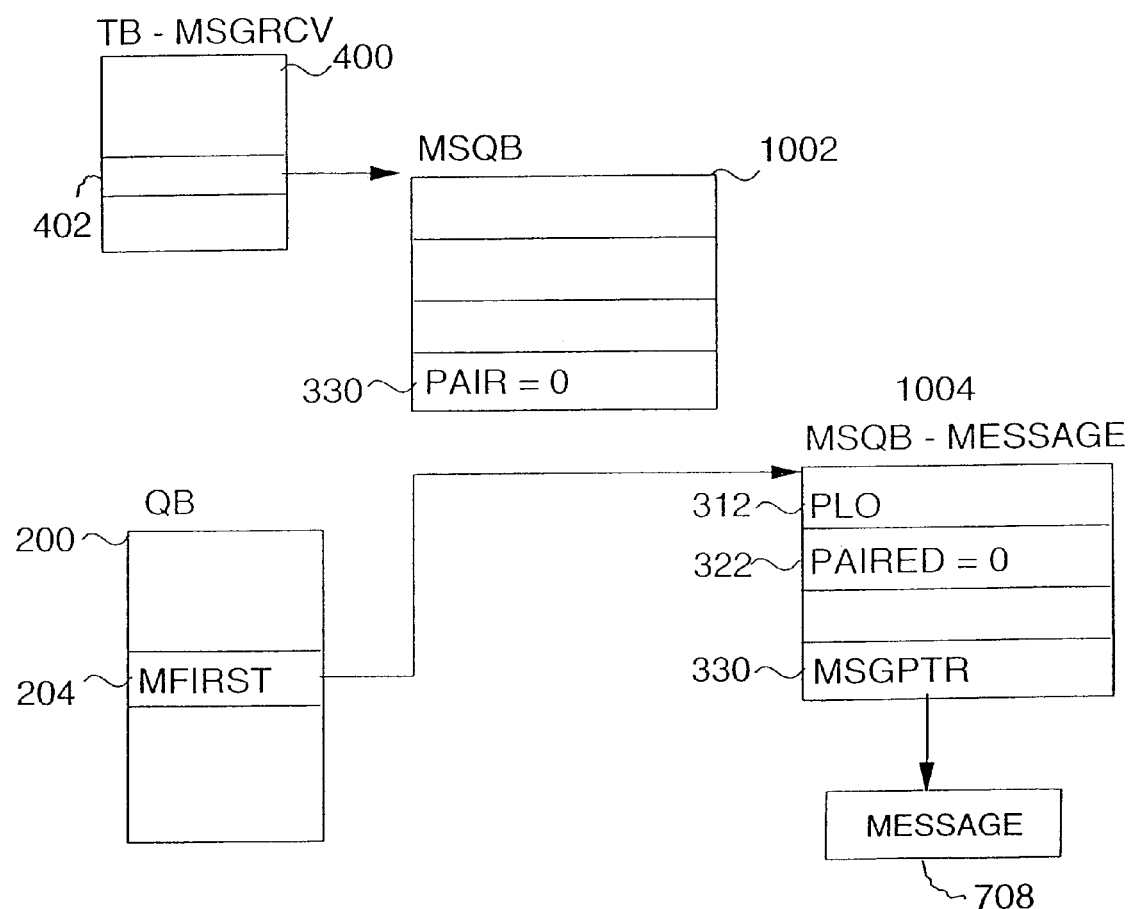
FIG. 10A shows the state of the data structures before the PLO instruction when assigning a message currently on the message queue to a message receiving task.
Figure 10B:
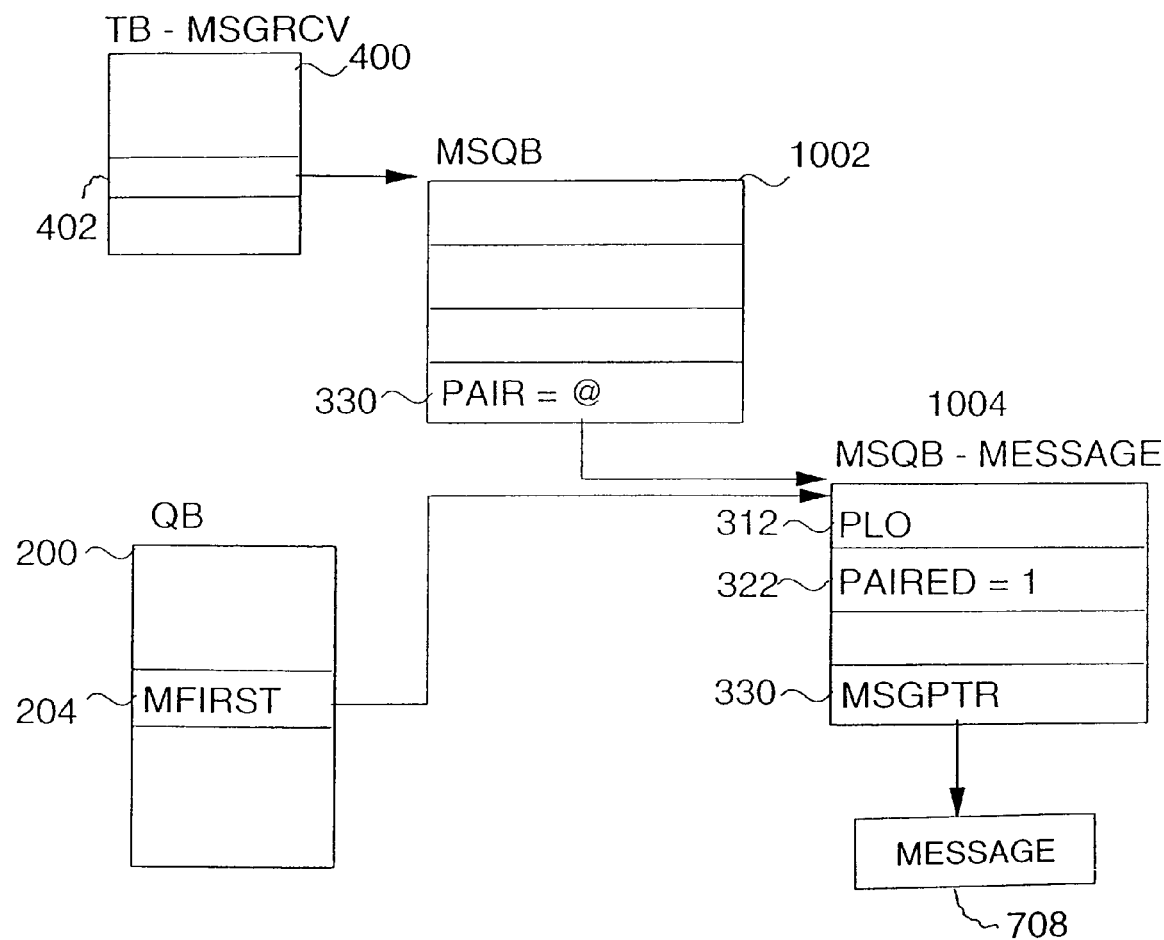
FIG. 10B shows the state of the data structures after the PLO instruction when assigning a message currently on the message queue to a message receiving task.

FIG. 10A shows the before picture of PLO processing to pair a message on the message queue to a task in a msgrcv call. The msgrcv caller's TB 400 has a pointer 402 to the MSQB for the msgrcv. The QB 100 has an anchor to the message chain (MFIRST 204) which points to a chain of MSQBs 1004. The PLO operation will compare and swap on the PLO field 312 to make sure all flags are currently zero and will set the paired flag 322. If this compare and swap is successful, then the PLO instruction will also change the PAIR pointer 330 in MSQB 1002 to point to the MSQB 1004 for the message. Note that this does not remove the message from the message queue, but will prevent any other tasks in msgrcv from using it, because it has already been paired to a msgrcv task. FIG. 10B shows the state of the control structures after the PLO instruction completes successfully.

Lock

Figure 12:
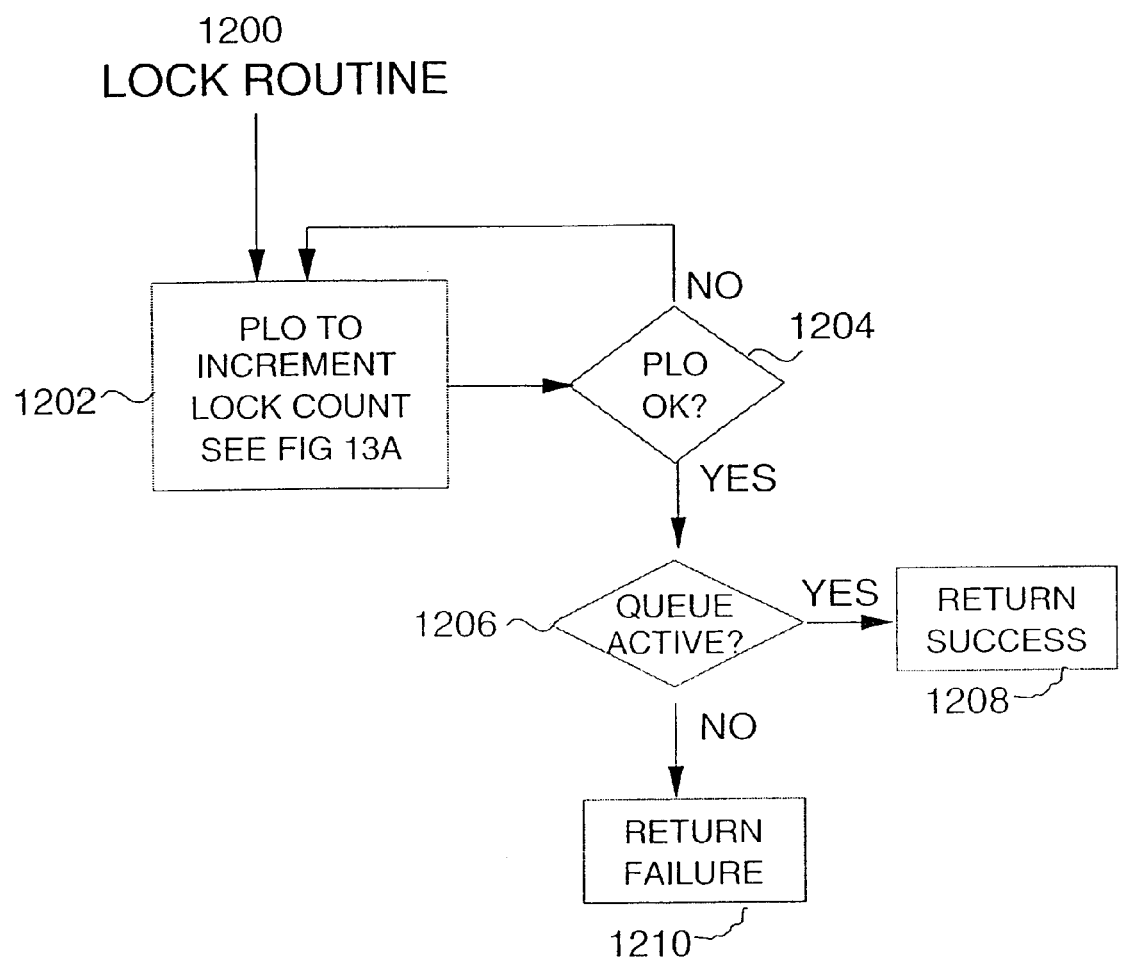
FIG. 12 shows the logic of the LOCK routine.

FIG. 12 shows the LOCK routine 1200. The LOCK routine issues a PLO instruction 1202 (see FIGS. 13A and 13B) to increment the USE-COUNT 116 for the requested message queue. Once the USE-COUNT 116 has been successfully incremented, then the message, sender and receiver chains can be used without fear of the chain pointers changing out from under the code. If the PLO operation fails 1204, then it simply retries the operation 1202. This will normally occur if another task is locking or unlocking the queue. If the PLO operation is successful 1204, then a check is made 1206 to see if the message queue is still active (not being deleted). If it is still active 1206, the control returns to the caller for success 1208. If the message queue is no longer active 1206, then control returns to the caller indicating failure 1210.

Figure 13A:
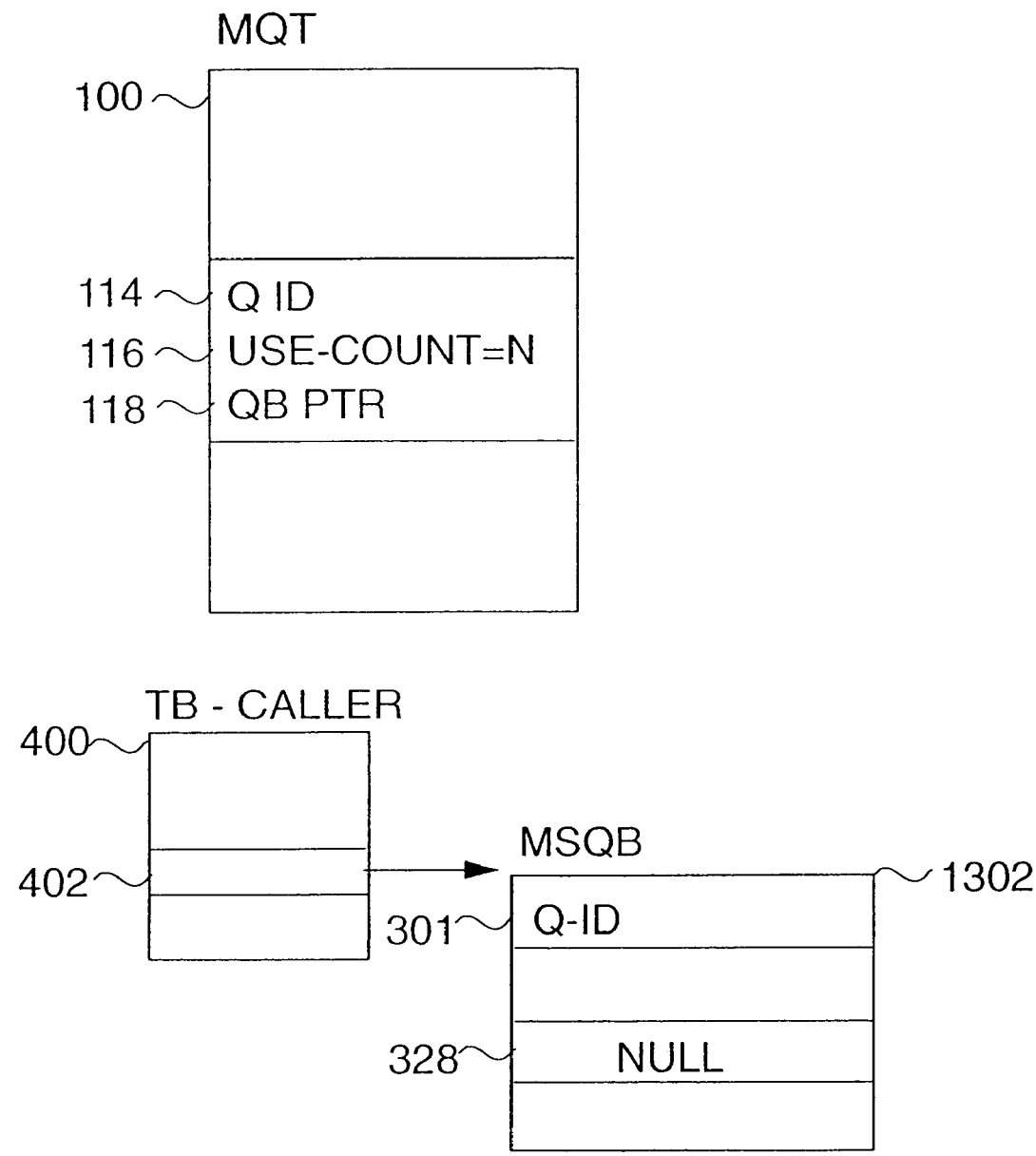
FIG. 13A shows the state of the data structures before the PLO instruction to perform the lock function.

FIG. 13A shows the state of the message queue control blocks before a LOCK operation. The MQT 100 has an entry for the queue being locked identified by message queue ID (Q-ID 114). The USE-COUNT 116 has a current value of N which represents how many tasks are currently processing the elements in the message queue. The caller of LOCK has a TB 400 with a pointer 402 to an MSQB 1302 which identifies which service the caller is performing (i.e. msgsnd, msgrcv). The MSQB 1302 has the Q-ID 301 in it which allows recovery to know which message queue 114 needs cleaning up. The USECNTFLG field 328 is currently NULL meaning that this caller does not have the message queue locked. The PLO instruction will perform a compare double and swap on the USE-COUNT 116 and the QB Pointer 118. This will increment the USE-COUNT 116 to N+1 and will verify that the QB Pointer 118 does not change. If the compare double and swap is successful, then the PLO instruction will also store the text "MSGCOUNT" in the USECNTFLG field 328.

Figure 13B:
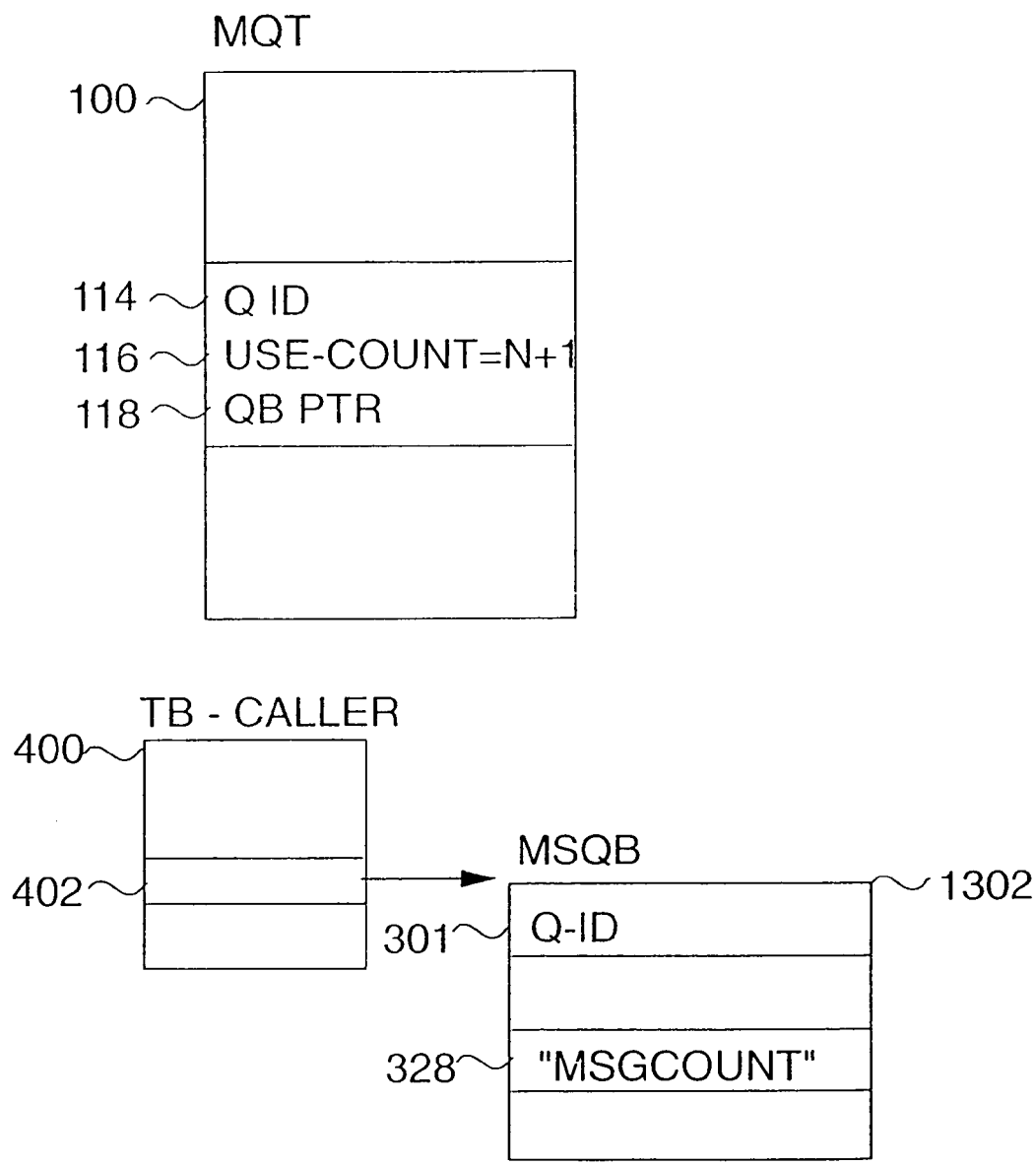
FIG. 13B shows the state of the data structures after the PLO instruction to perform the lock function.

FIG. 13B shows the state of the control blocks after a successful PLO instruction. After locking the message queue, any recovery operation will see the message queue Q-ID 301 and the USECNTFLG field 328 and know that it must do an UNLOCK operation against that message queue. Because the locking and the footprint (USECNTFLG= "MSGCOUNT") are performed atomically by a PLO operation, there is no window where the queue is locked without being adequately covered by the footprint.

Unlock

Figure 14:
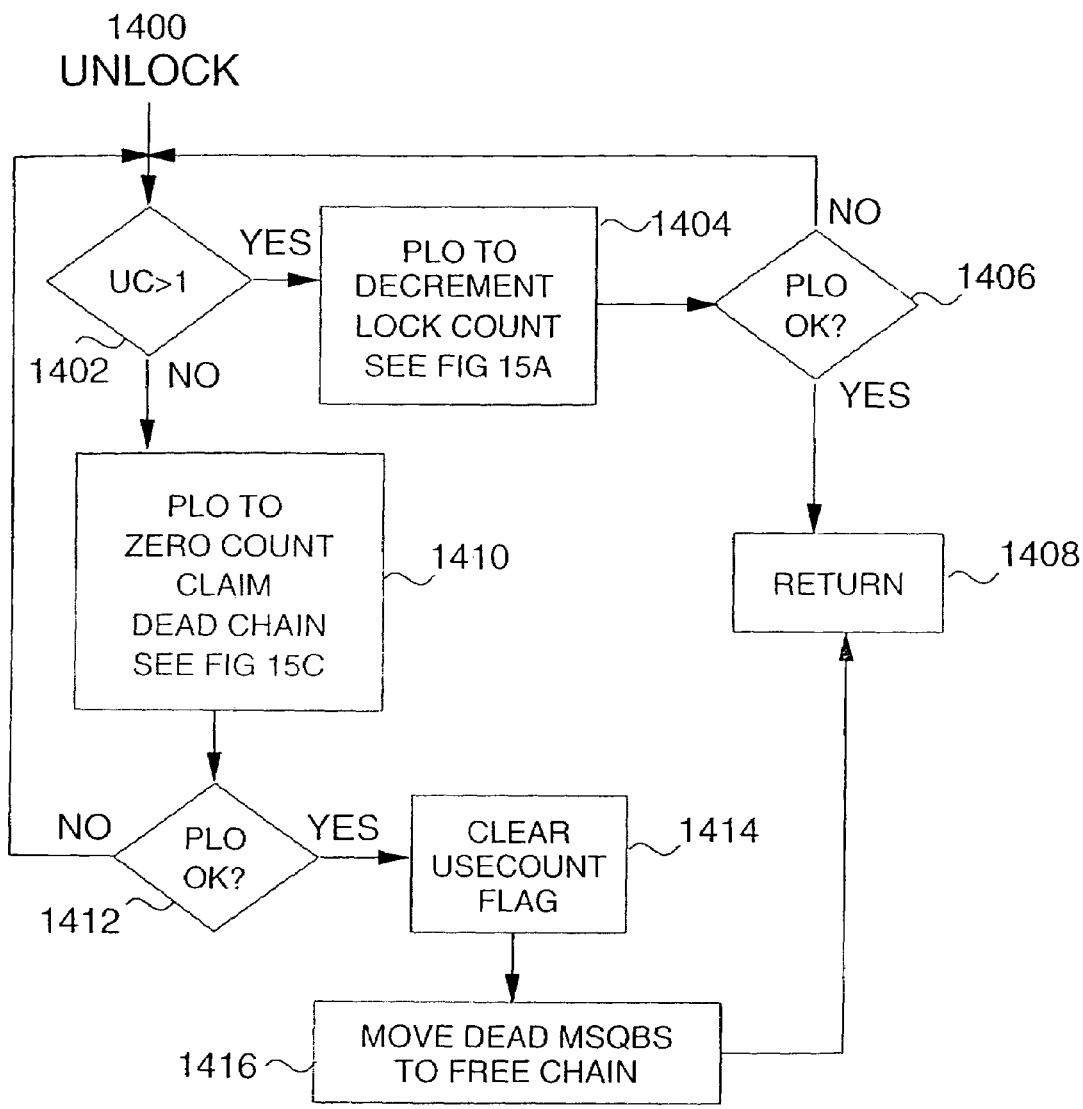
FIG. 14 shows the logic of the UNLOCK routine.

FIG. 14 shows the high level logic of the UNLOCK 1400 function. If the USE-COUNT 116 is greater than 1, then perform a PLO operation 1404 to decrement the USE-COUNT 116 (See FIGS. 15A and 15B for details). If the PLO operation fails 1406, then go back to the beginning to test the USE-COUNT 116 value at step 1402. If the PLO operation is successful 1406, then return to the caller 1408 of the UNLOCK routine. If the initial test of the USE-COUNT 402 shows it to be equal to 1, then a PLO (double compare and swap) instruction 1410 is done to both decrement the USE-COUNT and claim ownership of the DEAD chain 216. That is, the only time the DEAD chain 216 can be cleaned up is when there are no other tasks running the MSQBs in any of the chains. This PLO instruction is described in detail in FIGS. 15C and 15D. If the PLO operation is not successful 1412, then control returns to the initial USE-COUNT 116 test at step 1402. If the PLO operation is successful 1412, then the USECNTFLG field 328 in the caller's MSQB 1502 is cleared. The calling task now has the DEAD chain anchored in the caller's MSQB 1502 TOBEFREED field 334. Since no other tasks can see this local copy of the dead chain, this task can place these element back on the free chain 102. After freeing all the dead elements, control is returned to the caller 1408.

Figure 15A:
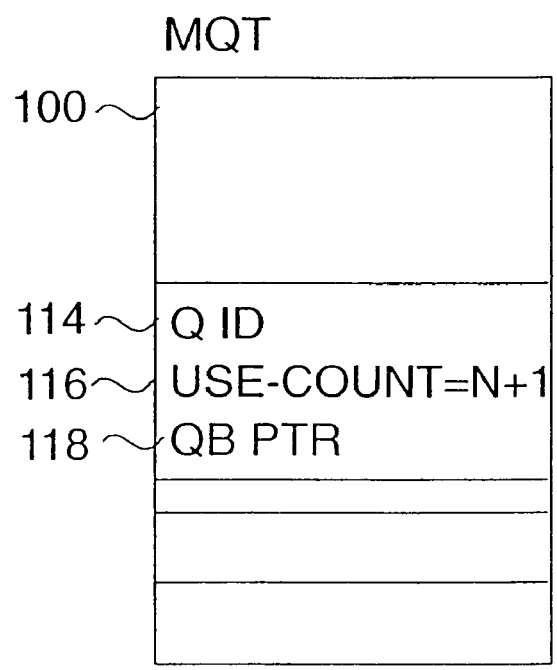
FIG. 15A shows the state of the data structures before the PLO instruction to perform the unlock function when use count is greater than 1.
Figure 15A:
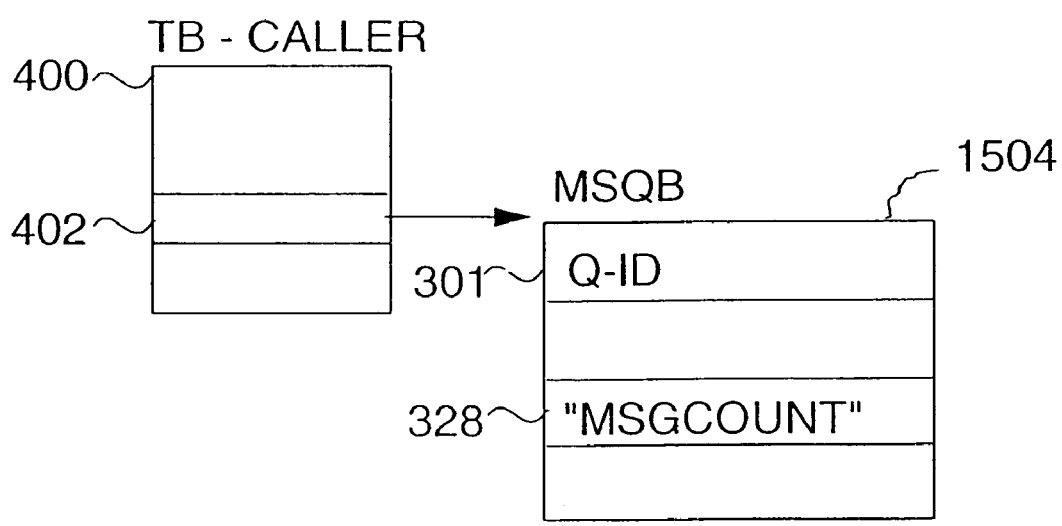
Figure 15B:
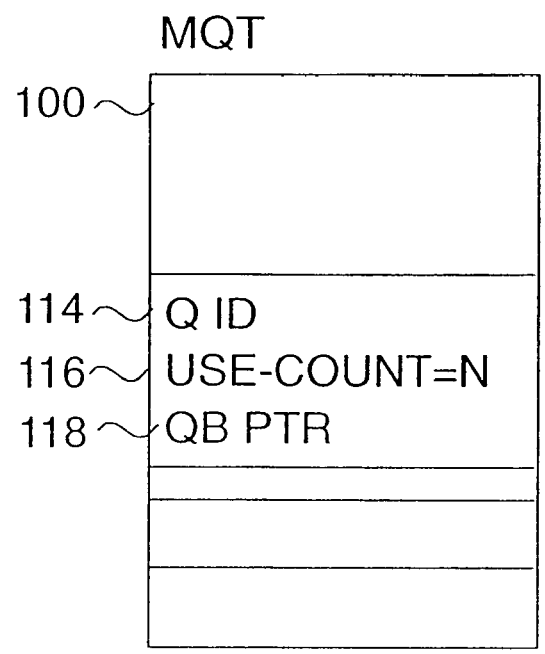
FIG. 15B shows the state of the data structures after the PLO instruction to perform the unlock function when use count is greater than 1.
Figure 15B:
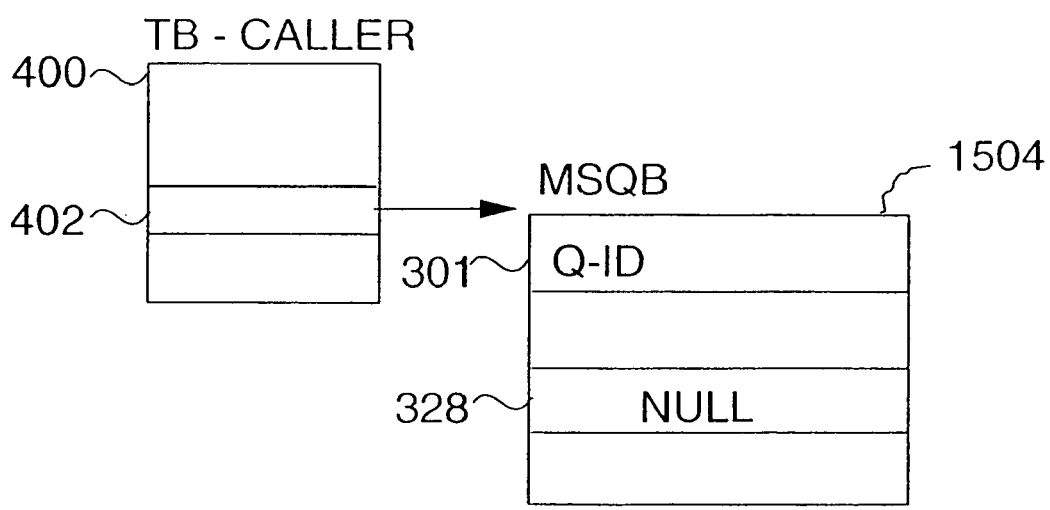

FIG. 15A shows the state of the message queue control blocks prior to an UNLOCK operation when the USE-COUNT 116 is greater than 1. The caller's MSQB 1504 has the USECNTFLG field 328 set to "MSGCOUNT". The PLO operation will compare and swap on the USE-COUNT 116 field trying to change the USE-COUNT 116 from N to N−1. If the PLO operation is successful, the USECNTFLG 328 in MSQB 1504 is changed to NULL. Any recovery operations after the successful PLO operation will not result in further action against the USE-COUNT 116. FIG. 15B shows the state of the control blocks after the successful PLO instruction.

Figure 15C:
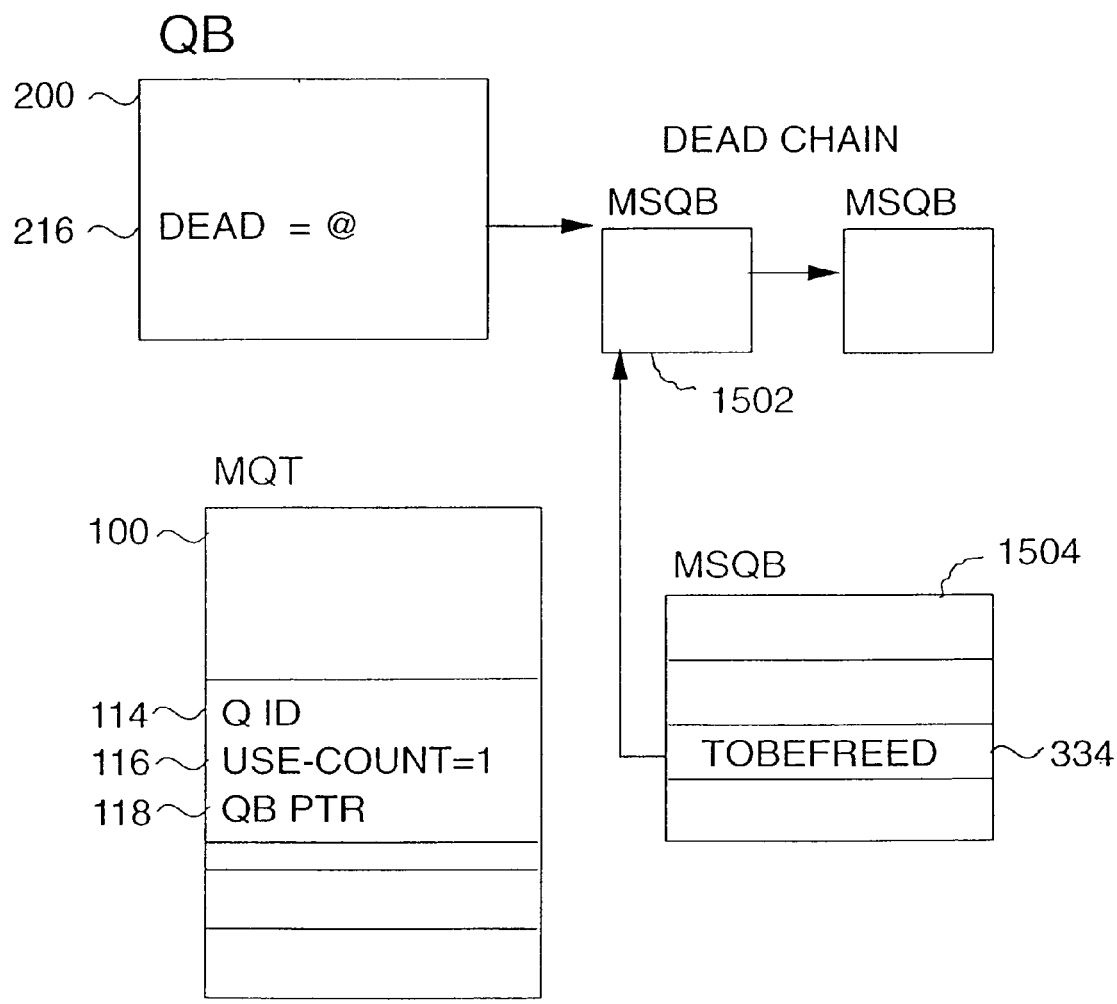
FIG. 15C shows the state of the data structures before the PLO instruction to perform the unlock function when use count is 1.
Figure 15D:
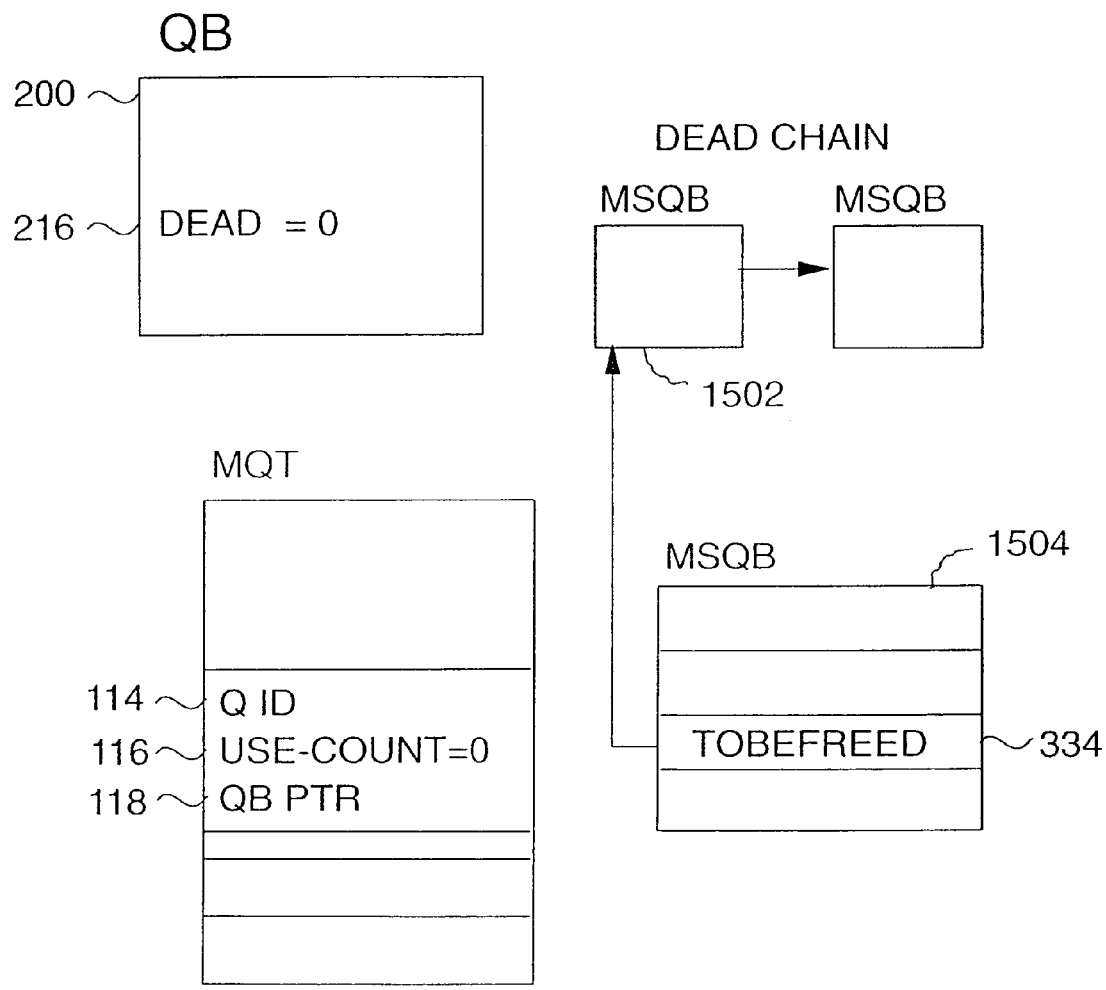
FIG. 15D shows the state of the data structures after the PLO instruction to perform the unlock function when use count is 1.

FIG. 15C shows the state of the message queue control blocks prior to an UNLOCK operation when the USE-COUNT 116 is equal to 1. The caller's MSQB 1504 has the USECNTFLG field 328 set to "MSGCOUNT". The PLO operation will compare and swap on both the USE-COUNT 116 field (trying to change the USE-COUNT 116 from 1 to 0), and the dead chain anchor 216 (trying to set it to zero). If the PLO operation is successful, the USECNTFLG 328 in MSQB 1504 is changed to NULL, and the old address of the dead chain is saved in the TOBEFREED field 334 in the caller's MSQB 1504. Any recovery operations after the successful PLO operation will not result in further action against the USE-COUNT 116. By saving the dead chain in the TOBEFREED field 334, it allows recovery to free the dead elements when the MSQB 1504 containing the TOBEFREED anchor is cleaned up. FIG. 15D shows the state of the control blocks after the successful PLO instruction.

Chain

Figure 16:
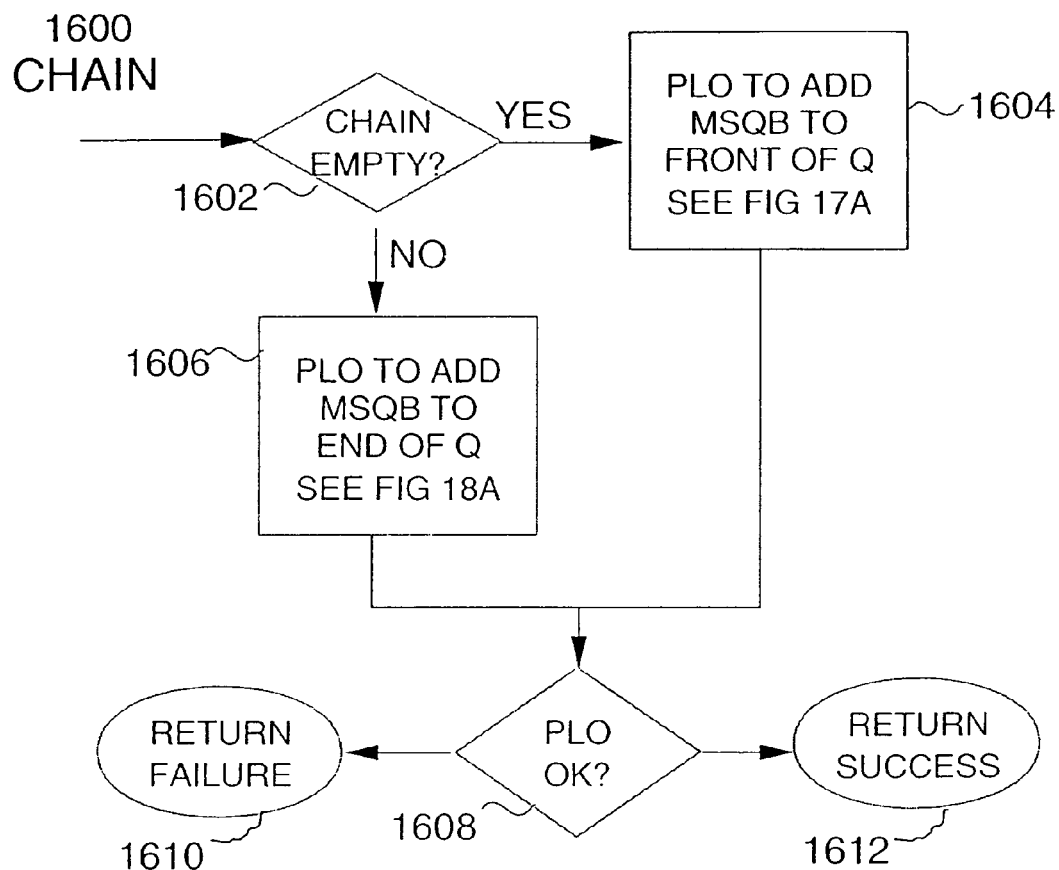
FIG. 16 shows the logic of the CHAIN routine.
Figure 17A:
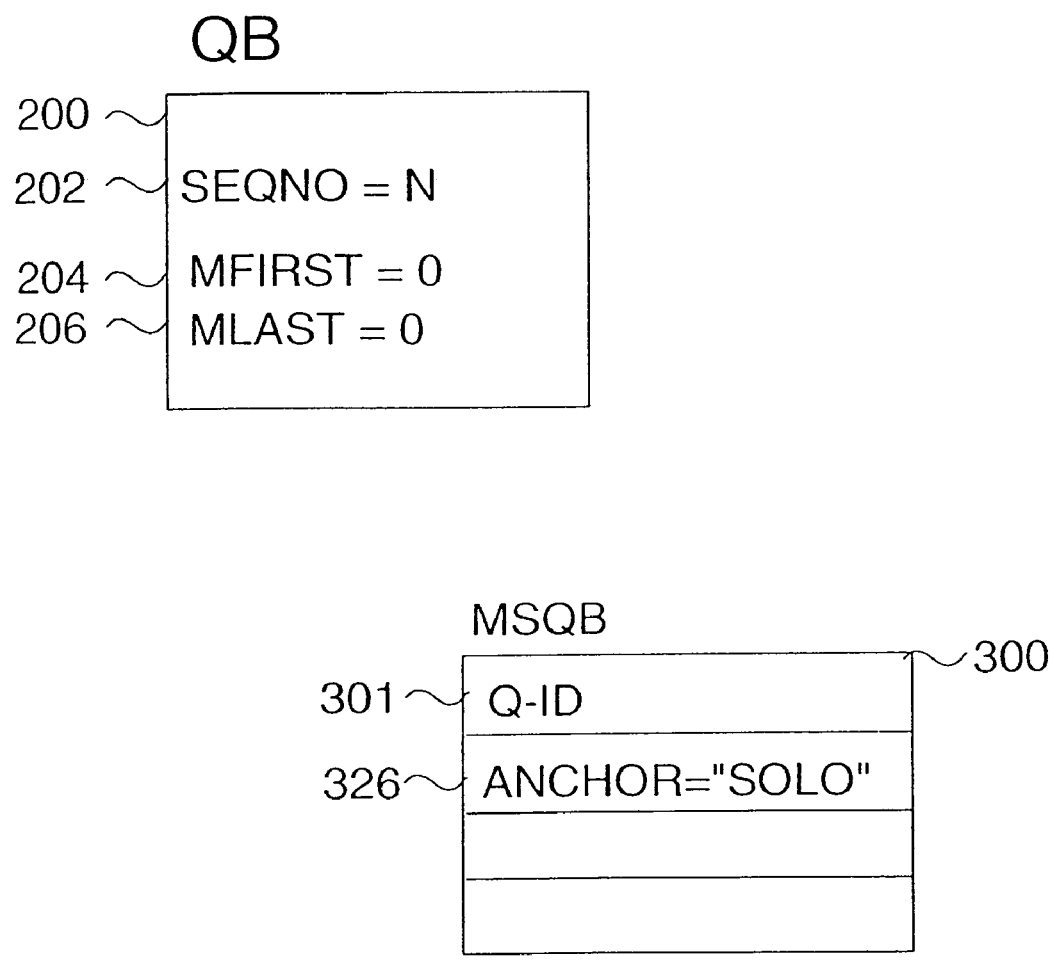
FIG. 17A shows the state of the data structures before the PLO instruction to perform the chain operation to the front of the queue.
Figure 17B:
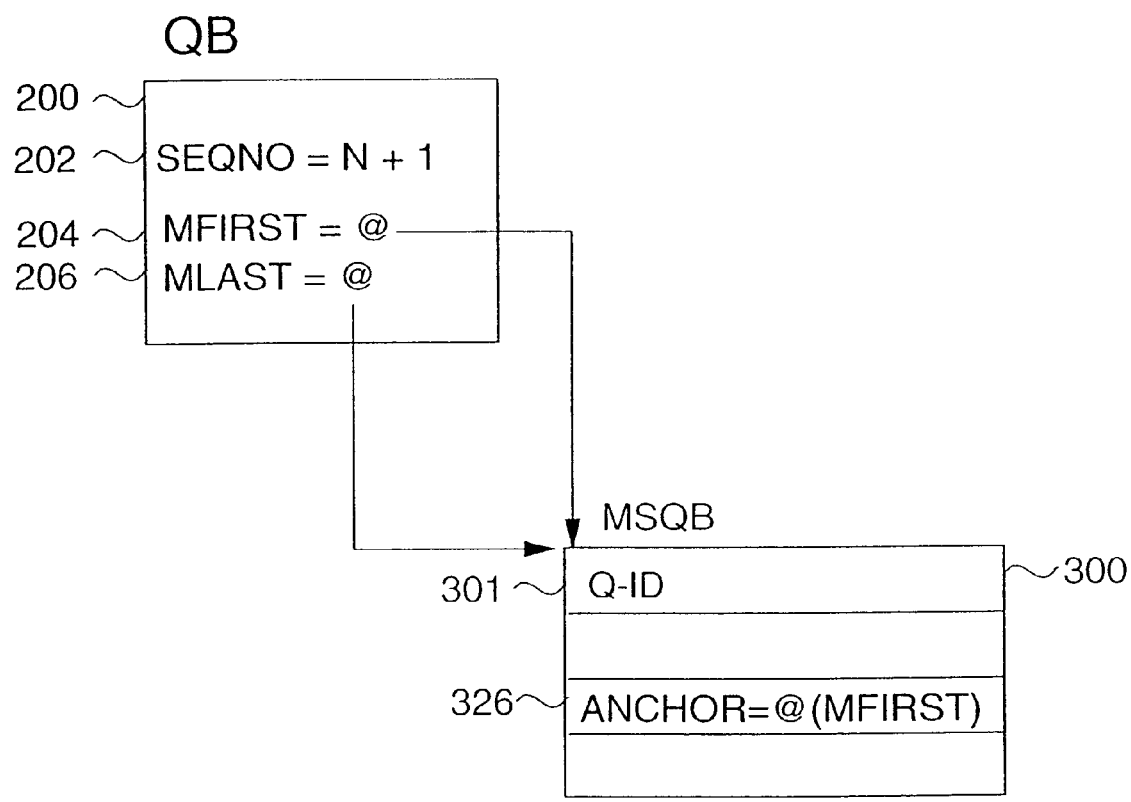
FIG. 17B shows the state of the data structures after the PLO instruction to perform the chain operation to the front of the queue.
Figure 17C:
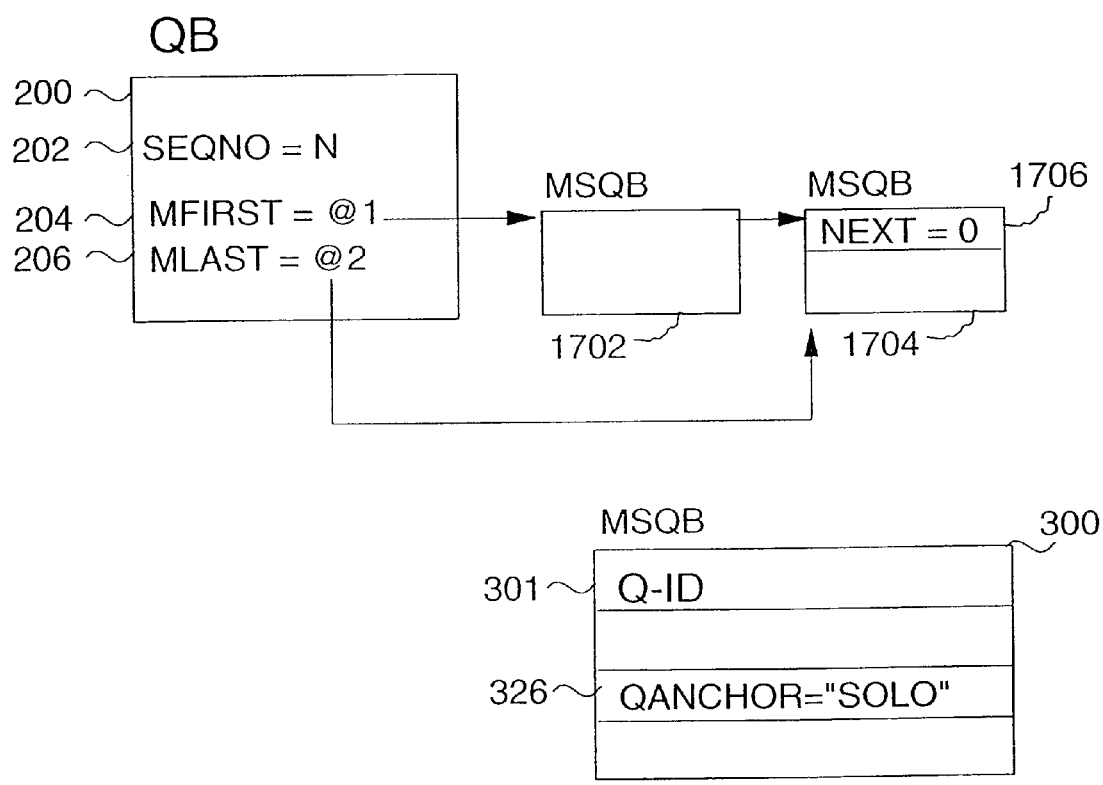
FIG. 17C shows the state of the data structures before the PLO instruction to perform the chain operation to the end of the queue.
Figure 17D:
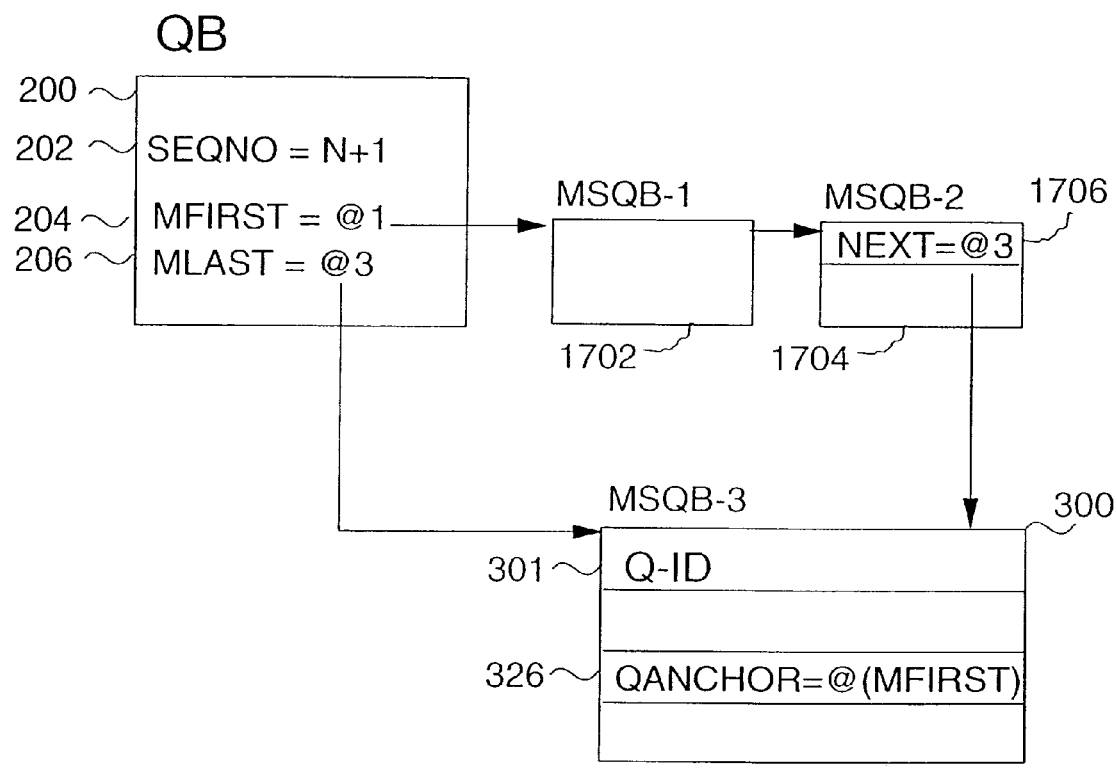
FIG. 17D shows the state of the data structures after the PLO instruction to perform the chain operation to the end of the queue.

FIG. 16 shows the high level flow of the CHAIN 1600 routine. This common CHAIN routine can add a MSQB to the end of any one of the three chains within a message queue (sender, receiver, or message). On input, the CHAIN routine is passed the address of the MSQB to be chained, the address of the anchor pointers (first and last), and the compare value that is to be used in the PLO operation (i.e. the PLO primed SEQNO 202). The CHAIN routine checks to see if the target chain is empty 1602. If it is empty, a PLO instruction 1604 is used to add the passed MSQB to the head and tail of the requested chain. FIGS. 17A and 17B show the before and after state of the queue control blocks for adding to an empty chain. If the chain is not empty 1602, a PLO instruction 1606 is used to add the passed MSQB to the end of the requested chain. FIGS. 17C and 17D show the before and after state of the queue control blocks for adding to a non-empty chain. Regardless of which PLO format is used, a check is made to determine if the PLO operation was successful 1608. If successful, control is returned to the caller with success 1612. If the PLO operation failed, then control is returned to the caller with a failure status 1610. The CHAIN routine uses the PLO primed sequence number extracted by the calling routine as the basis of the PLO compare and swap. If the current SEQNO 202 for the message queue has changed, then the routine calling CHAIN verifies that it is still appropriate for the MSQB to be chained.

FIG. 17A shows the state of the queue control blocks prior to a PLO operation to add a MSQB 300 as the only element on a chain. This example shows a request to add a MSQB 300 to the message chain anchored by MFIRST 204 with the end of the chain pointed to by MLAST 206. Since the chain is empty, both MFIRST 204 and MLAST 206 are zero. MSQB 300 identifies the queue it is participating in by the Q-ID 301. Prior to the PLO operation, the ANCHOR field 326 shows the string "SOLO" to indicate that it is not on any chain. The PLO instruction will perform a compare double and swap on the SEQNO 202 to increment the sequence number. It will also store the address of MSQB 300 in both MFIRST 204 and MLAST 206. Finally, it will store the address of the chain header (MFIRST 204) in the ANCHOR field 326 of MSQB 300. After the PLO operation has successfully completed, any recovery operations will see that MSQB 300 is anchored on the message chain.

FIG. 17B shows the state of the control blocks after the PLO operation has successfully completed. If the MSQB 300 were being added to the send waiter chain, then fields SFIRST 212 and SLAST 214 would have been used. If the MSQB 300 were being added to the receive waiter chain, then fields RFIRST 208 and RLAST 210 would have been used. All further CHAIN and UNCHAIN discussions use the message chain header in the diagrams.

FIG. 17C shows the state of the queue control blocks prior to a PLO operation to add an MSQB 300 to the end of a chain. This example shows a request to add a MSQB 300 to the end of the message chain anchored by MFIRST 204, with the end of the chain pointed to by MLAST 206. MFIRST 204 points to MSQB-1 1702 and MLAST 206 points to MSQB-2 1704. MSQB 300 identifies the queue it is participating in by the Q-ID 301. Prior to the PLO operation, the ANCHOR field 326 shows the string "SOLO" to indicate that it is not on any chain. The PLO instruction will perform a compare double and swap on the SEQNO 202 to increment the sequence number. It will also store the address of MSQB 300 in the NEXT 1706 pointer of the last MSQB 1704 and in MLAST 206. Finally, it will store the address of the chain header (MFIRST 204) in the ANCHOR field 326 of MSQB 300. After the PLO operation has successfully completed, any recovery operations will see that MSQB 300 is on the message chain. FIG. 17D shows the state of the control blocks after the PLO operation has successfully completed.

Unchain

Figure 18:
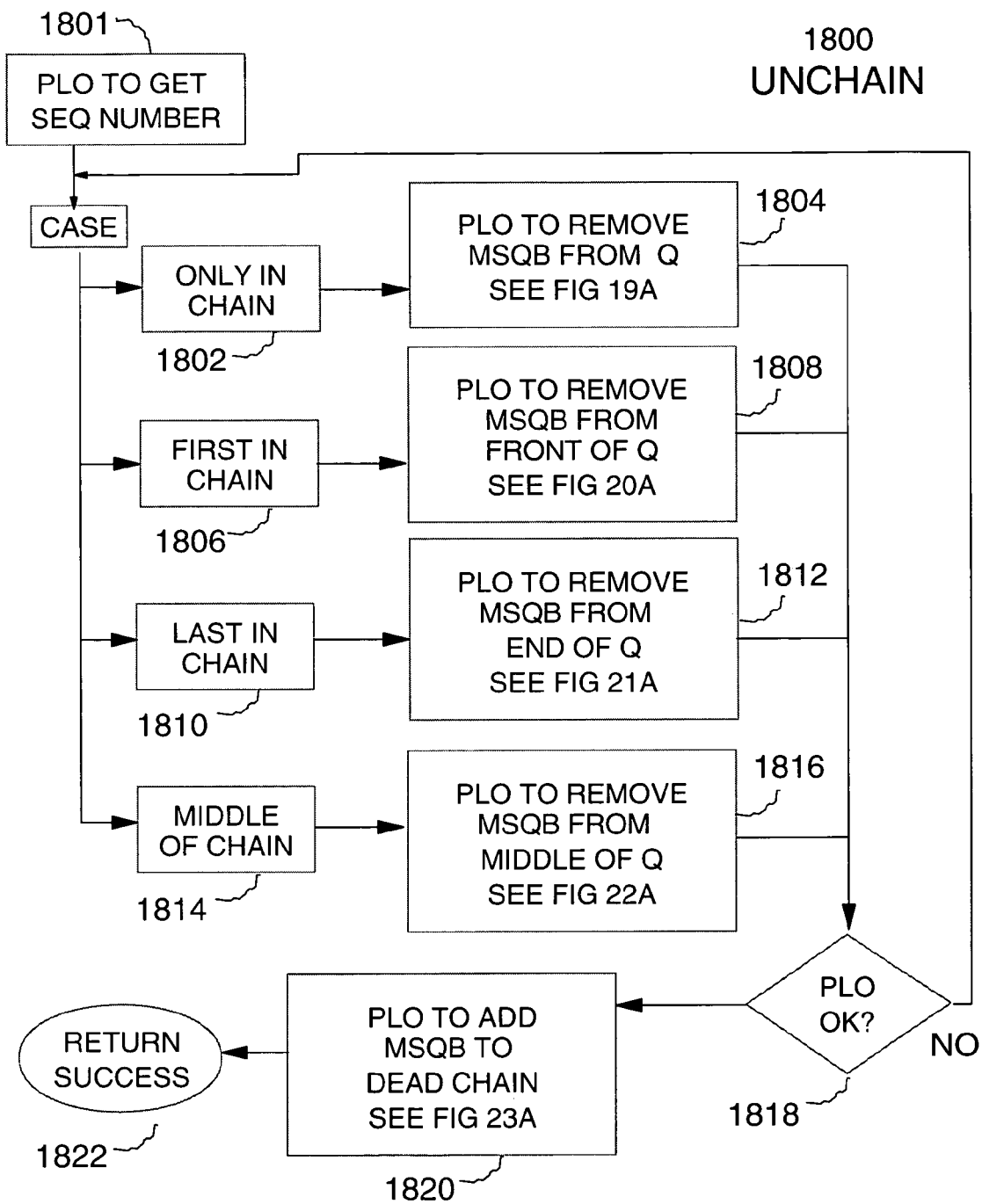
FIG. 18 shows the logic of the UNCHAIN routine.

FIG. 18 shows the high level flow of the UNCHAIN 1800 function. On input, the UNCHAIN routine is passed the address of the MSQB to be unchained and the address of the chain anchor pointers (first and last). This allows the common UNCHAIN routine to be used for unchaining MSQBs for messages, senders and receivers. On entry, UNCHAIN performs PLO sequence number 202 priming in preparation for the subsequent remove operation to insure all chain management control variables are consistent with the obtained SEQNO. It then puts the MSQB to be unchained into one of four categories: only in chain 1802 (PLO operations described in FIGS. 19A and 19B); first in chain 1806 (PLO operations described in FIGS. 20A and 20B); last in chain 1810 (PLO operations described in FIGS. 21A and 21B); or middle of chain 1814 (PLO operations described in FIGS. 22A and 22B). If the PLO operation was not successful 1818, the control returns to the top of the UNCHAIN routine to potentially reclassify the operation. If the PLO operation is successful, then another PLO operation is done to add the removed MSQB to the dead chain (see FIGS. 23A and 23B).

Figure 19A:
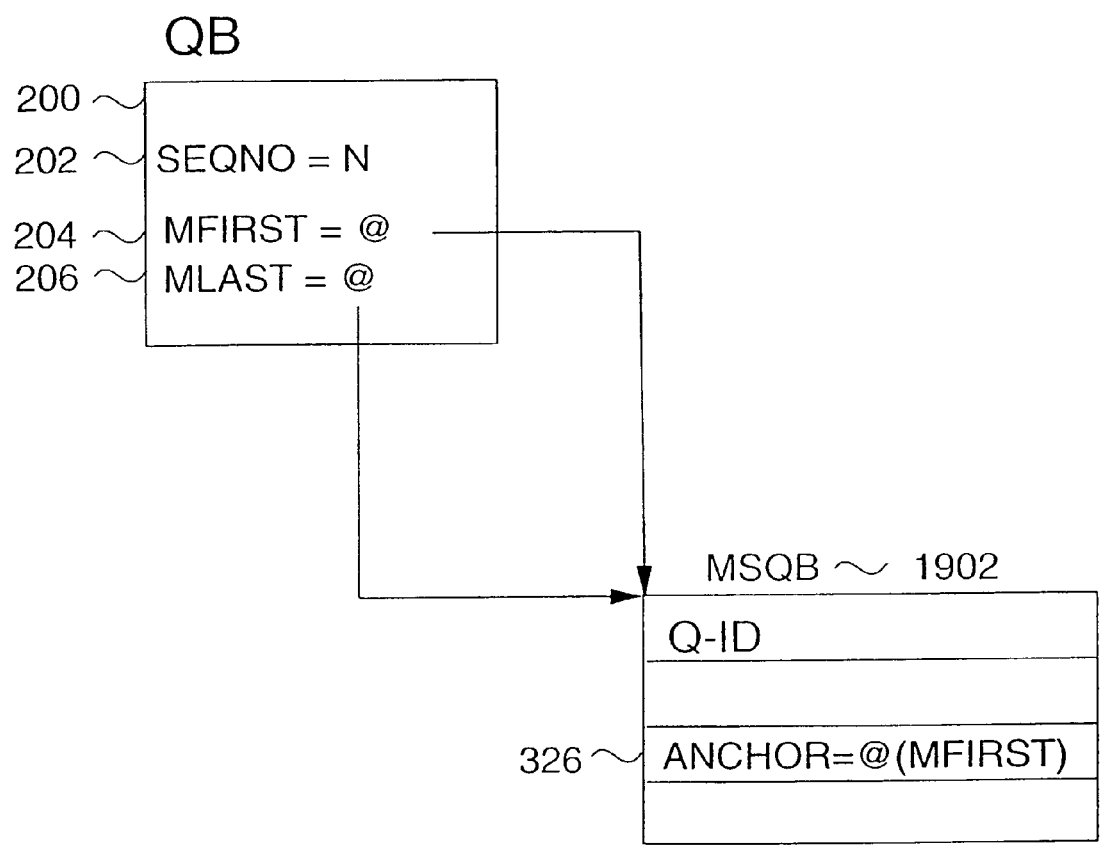
FIG. 19A shows the state of the data structures before the PLO instruction to perform the unchain operation on the only queue element.
Figure 19B:
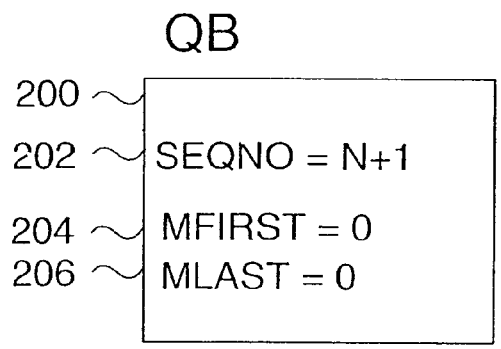
FIG. 19B shows the state of the data structures after the PLO instruction to perform the unchain operation on the only queue element.
Figure 19B:
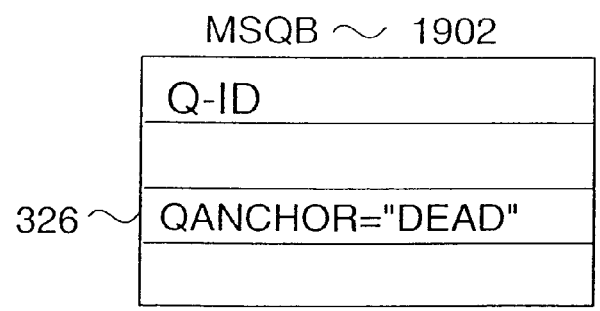

FIG. 19A shows the state of the message queue structures prior to a PLO operation to remove the only MSQB 1902 from the message chain. This processing would be essentially the same for removing a MSQB from the receiver or sender chain. The only difference would be that different chain anchors would be used. The same applies to all the following descriptions of removing an MSQB from a queue. The MFIRST 204 and MLAST 206 both point to the only MSQB 1902. The ANCHOR field 326 in the MSQB 1902 contains the address of the anchor pointer MFIRST 204. The PLO operation does a compare double and swap on the SEQNO 202 and stores a new sequence number that is 1 higher. Assuming the compare double and swap is successful, MFIRST 204 and MLAST 206 are both set to zero. The ANCHOR 326 in MSQB 1902 is set to "DEAD" to indicate it is no longer on an active queue. If the PLO operation fails, it is likely because another task has modified the queue and changed the sequence number 202. Because the queue has changed, the setup for the removal of an element is recalculated (back to FIG. 18).

Figure 20A:
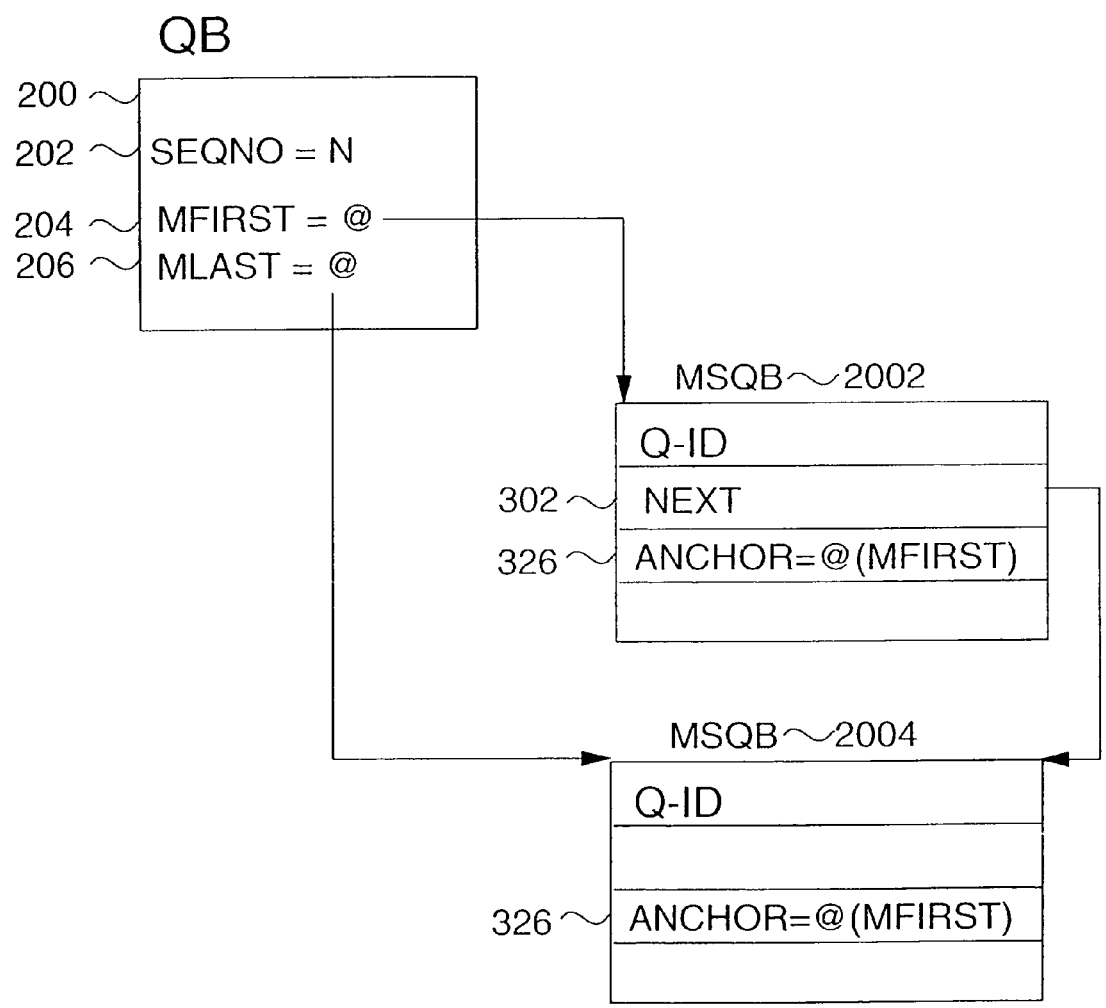
FIG. 20A shows the state of the data structures before the PLO instruction to perform the unchain operation from the front of the queue.

FIG. 20A shows the state of the message queue structures prior to a PLO operation to remove the first MSQB 2002 from the message chain. The MFIRST 204 points to MSQB 2002 and MLAST 206 points to MSQB 2004. The ANCHOR field 326 in the MSQB 2002 contains the address of the anchor pointer MFIRST 204. The PLO operation does a compare double and swap on the SEQNO 202 and stores a new sequence number that is 1 higher. Assuming the compare double and swap is successful, MFIRST 204 is changed to the address of MSQB 2004. MLAST 206 is unchanged. The ANCHOR 326 in MSQB 2002 is set to "DEAD" to indicate it is no longer on an active queue.

Figure 20B:
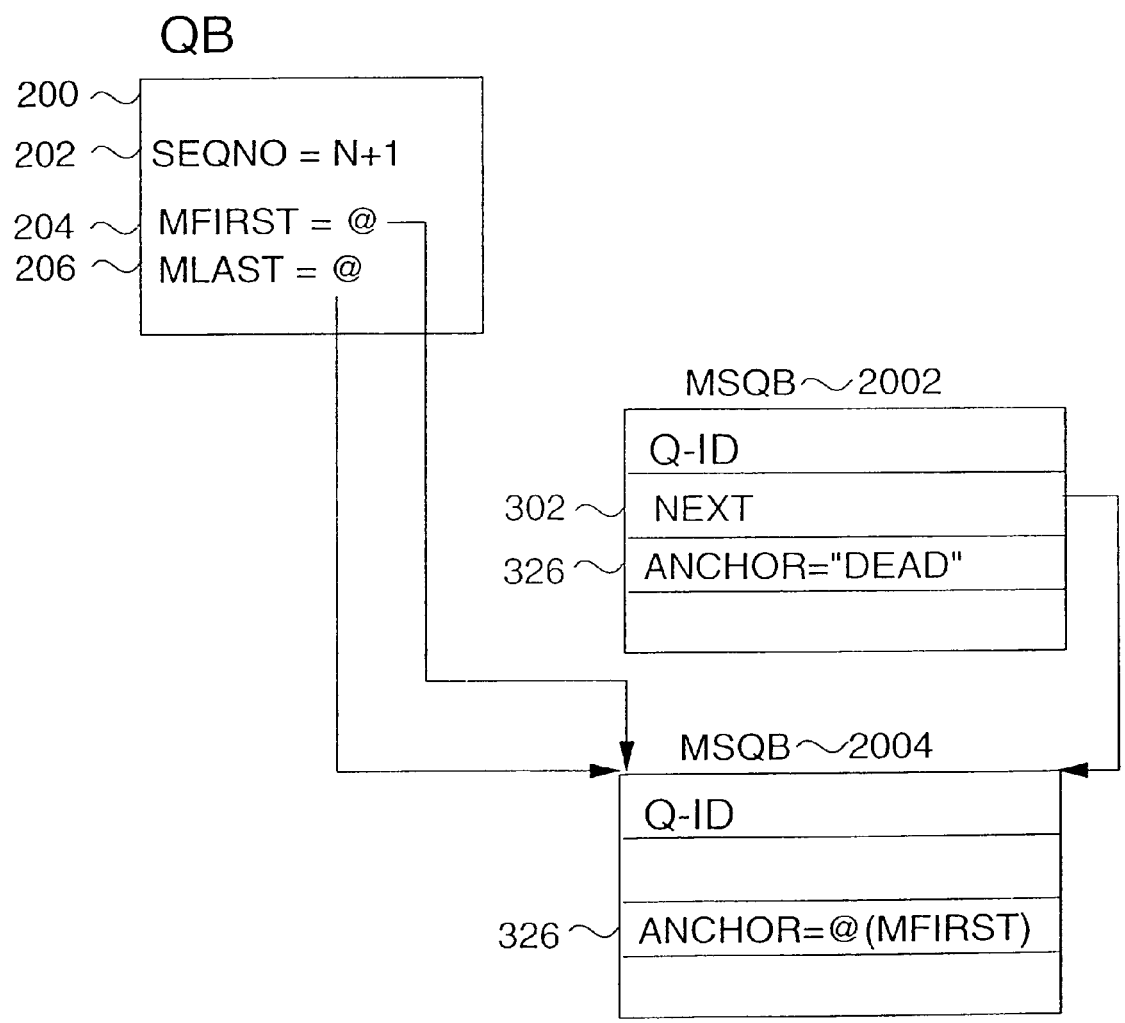
FIG. 20B shows the state of the data structures after the PLO instruction to perform the unchain operation from the front of the queue.

FIG. 20B shows the state of the control structures after the successful PLO operation. If the PLO operation fails, it is likely because another task has modified the queue and changed the sequence number 202. Because the queue has changed, the setup for the removal of an element is recalculated (back to FIG. 18).

Figure 21A:
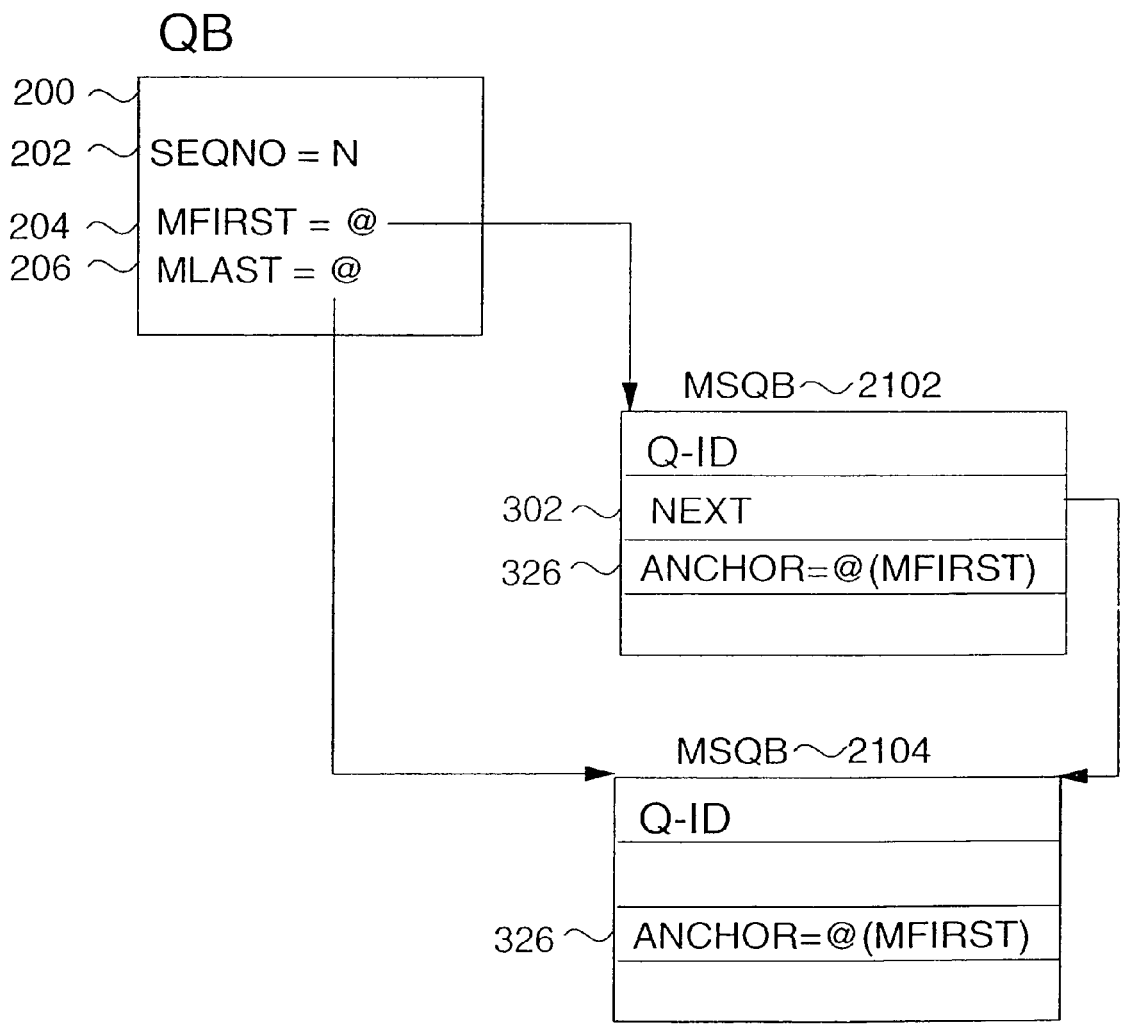
FIG. 21A shows the state of the data structures before the PLO instruction to perform the unchain operation from the end of the queue.

FIG. 21A shows the state of the message queue structures prior to a PLO operation to remove the last MSQB 2104 from the message chain. The MFIRST 204 points to MSQB 2102 and MLAST 206 points to the last MSQB 2104. The ANCHOR field 326 in the MSQB 2104 contains the address of the anchor pointer MFIRST 204. The PLO operation does a compare double and swap on the SEQNO 202 and stores a new sequence number that is 1 higher. Assuming the compare double and swap is successful, MFIRST 204 is unchanged. MLAST 206 is changed to point to MSQB 2102. The ANCHOR 326 in MSQB 2104 is set to "DEAD" to indicate it is no longer on an active queue.

Figure 21B:
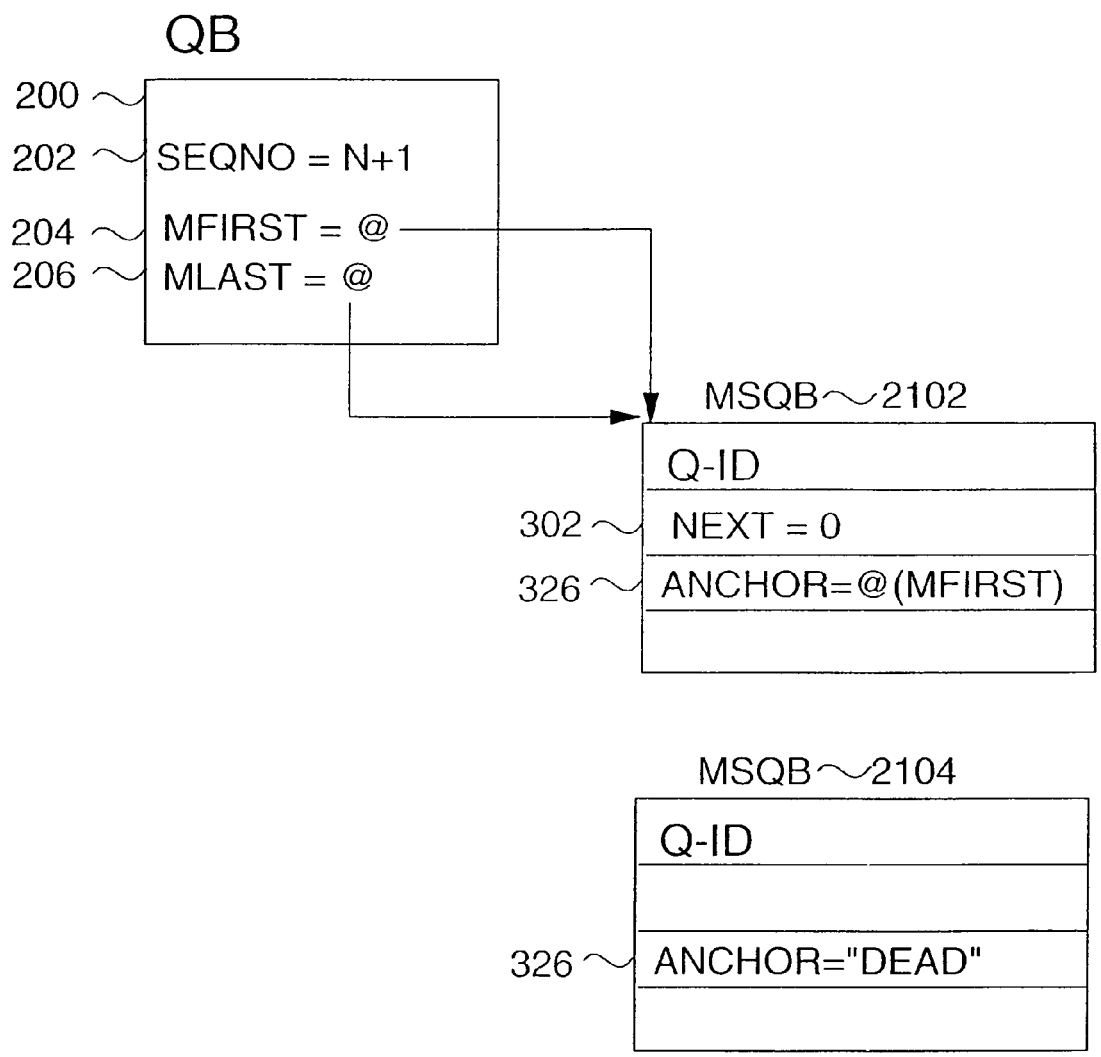
FIG. 21B shows the state of the data structures after the PLO instruction to perform the unchain operation from the end of the queue.

FIG. 21B shows the state of the control structures after a successful PLO operation. If the PLO operation fails, it is likely because another task has modified the queue and changed the sequence number 202. Because the queue has changed, the setup for the removal of an element is recalculated (back to FIG. 18).

Figure 22A:
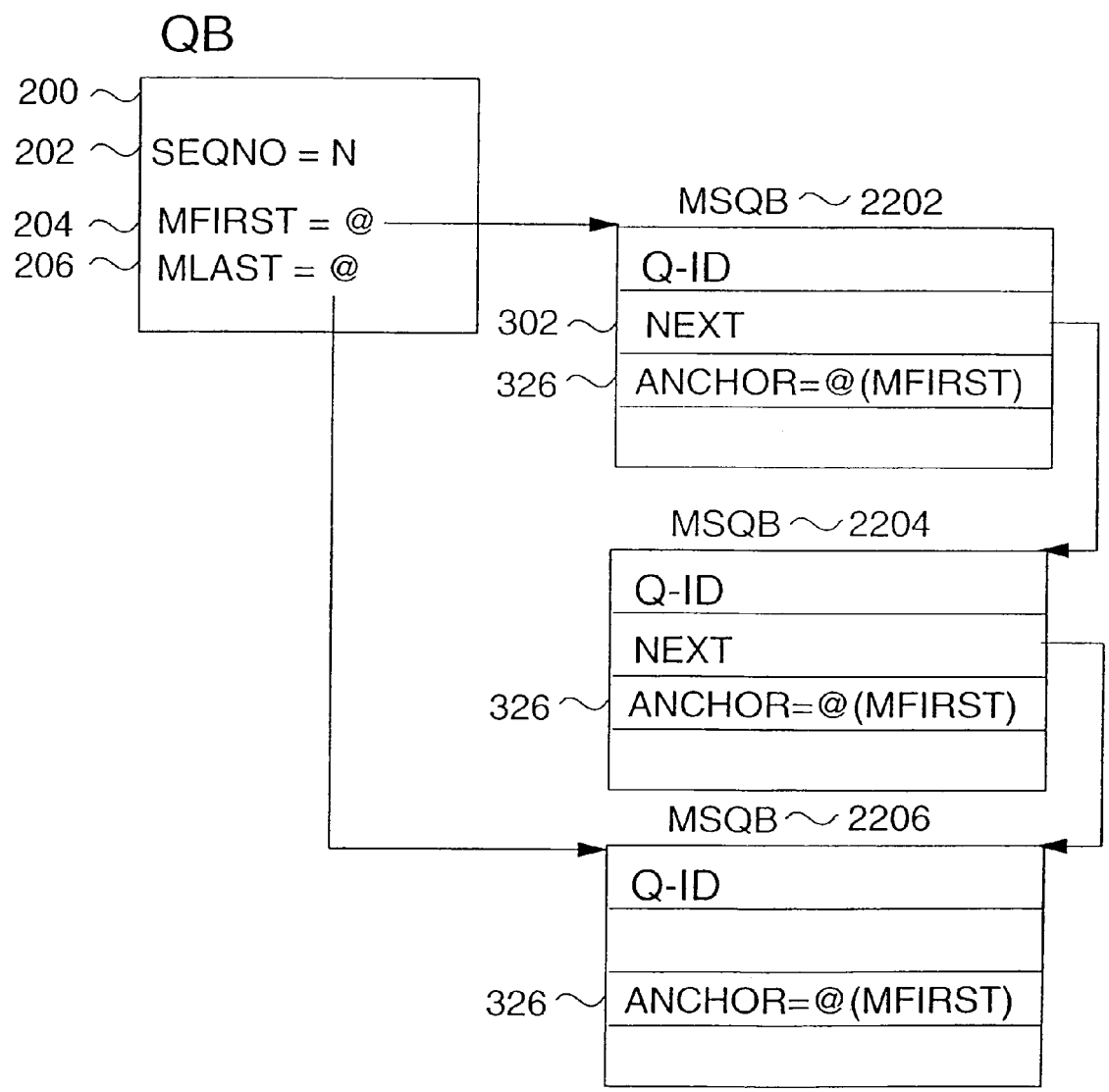
FIG. 22A shows the state of the data structures before the PLO instruction to perform the unchain operation from the middle of the queue.

FIG. 22A shows the state of the message queue structures prior to a PLO operation to remove MSQB 2204 from the middle of the message chain. The MFIRST 204 points to MSQB 2202 and MLAST 206 points to the last MSQB 2206. The ANCHOR field 326 in the MSQB 2204 contains the address of the anchor pointer MFIRST 204. The PLO operation does a compare double and swap on the SEQNO 202 and stores a new sequence number that is 1 higher. Assuming the compare double and swap is successful, NEXT pointer 302 in MSQB 2202 is set pointing to MSQB 2206. The ANCHOR 326 in MSQB 2204 is set to "DEAD" to indicate it is no longer on an active queue.

Figure 22B:
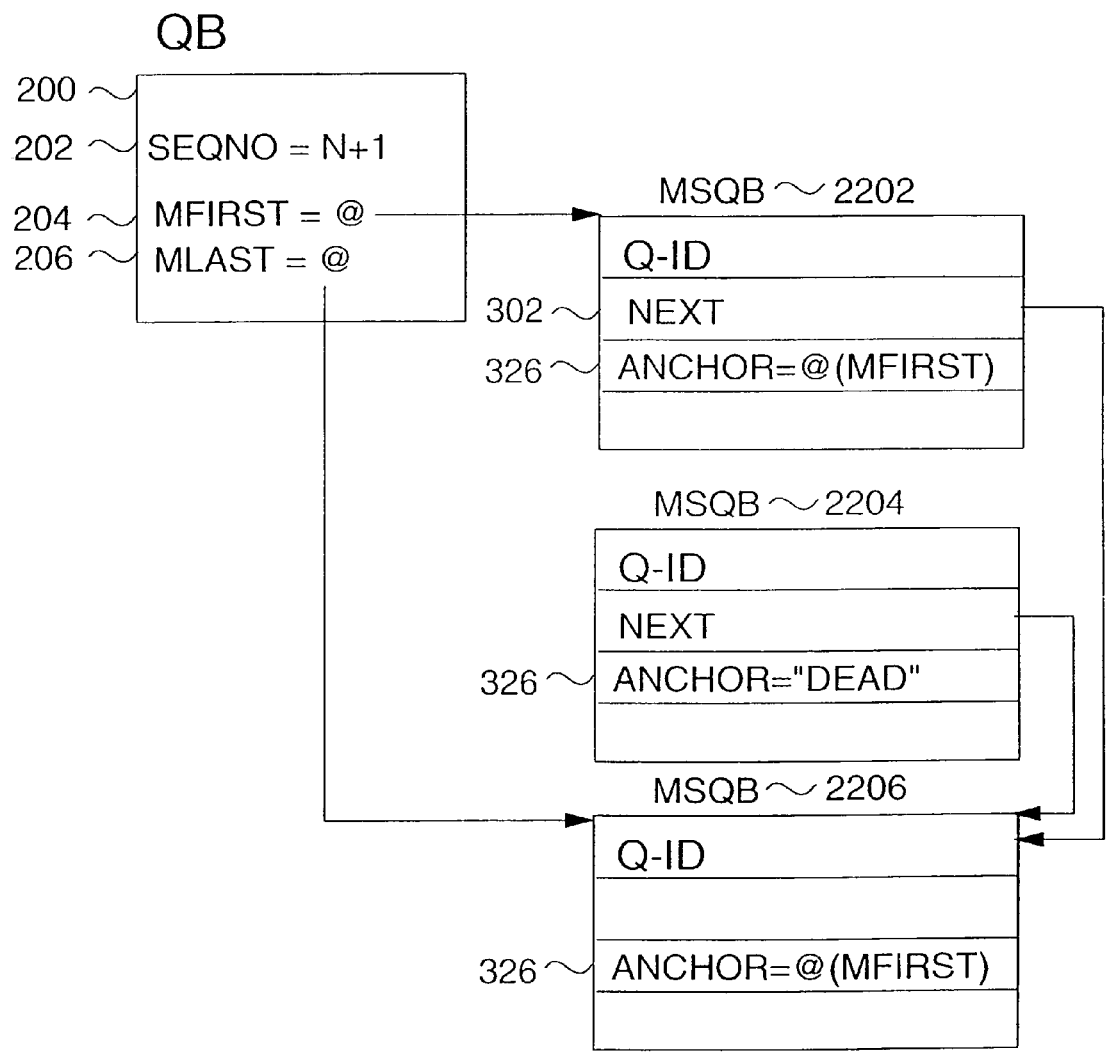
FIG. 22B shows the state of the data structures after the PLO instruction to perform the unchain operation from the middle of the queue.

FIG. 22B shows the state of the control structures after a successful PLO operation. If the PLO operation fails, it is likely because another task has modified the queue and changed the sequence number 202. Because the queue has changed, the setup for the removal of an element is recalculated (back to FIG. 18).

Figure 23A:
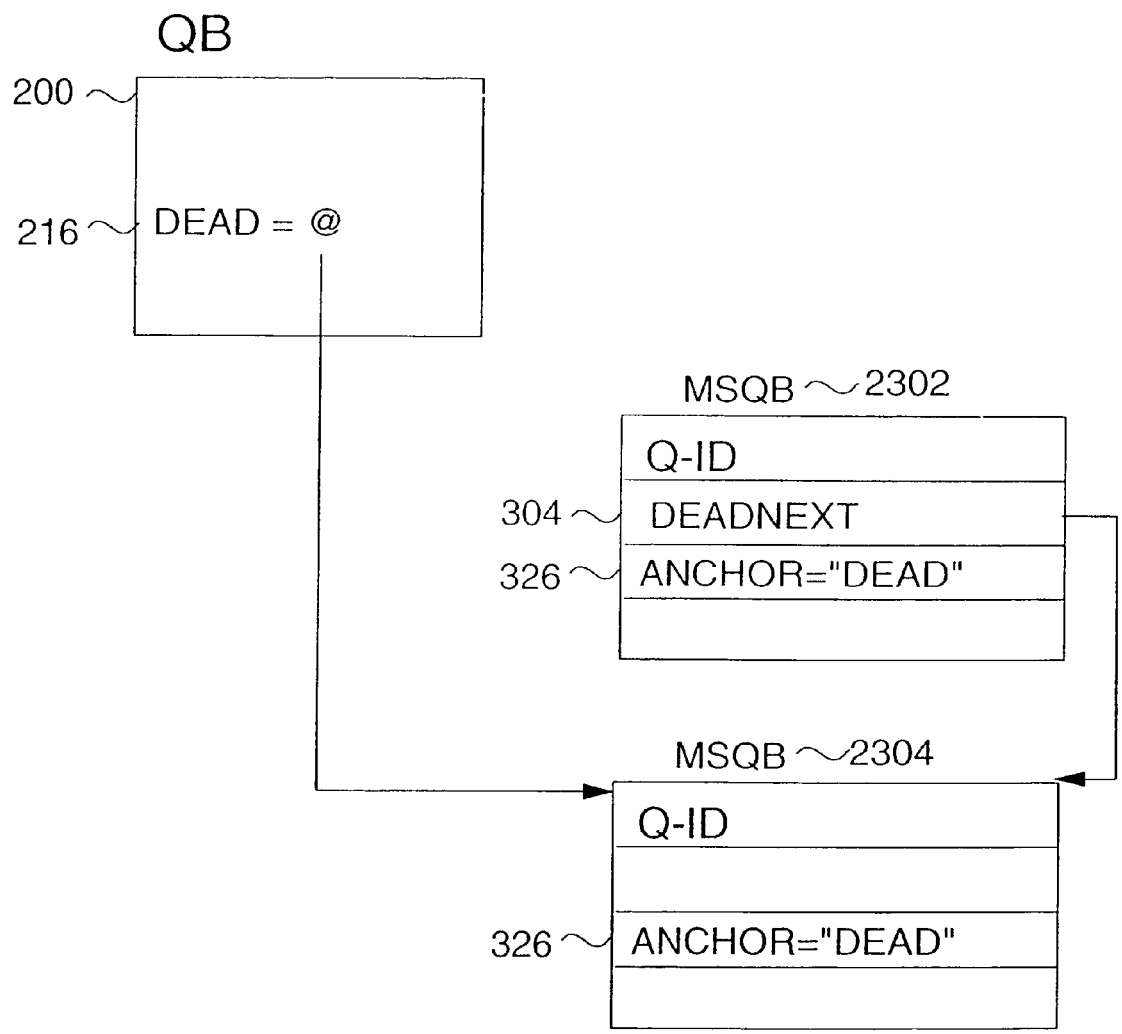
FIG. 23A shows the state of the data structures before the PLO instruction to perform the chain operation to the front of the dead queue.
Figure 23B:
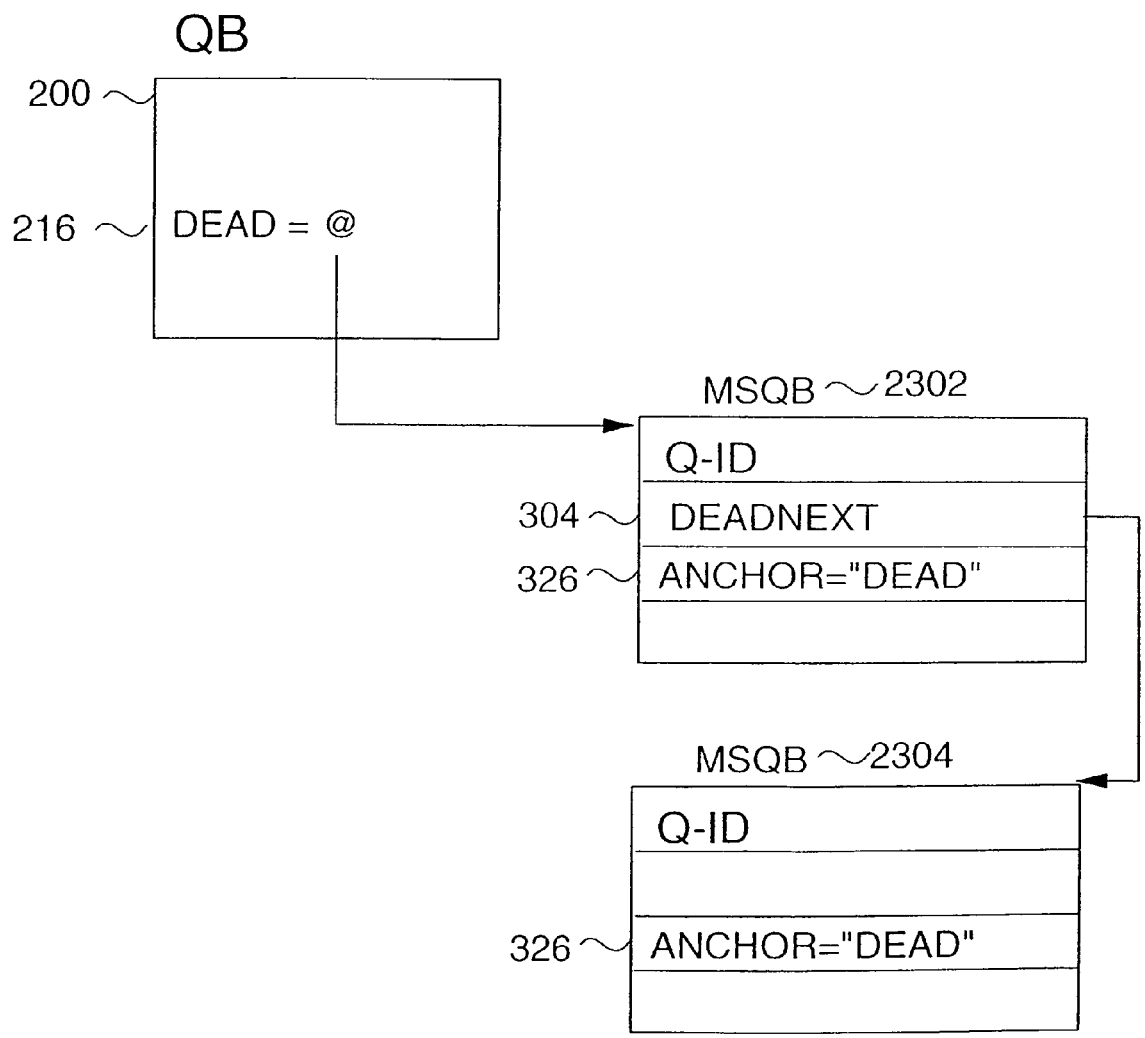
FIG. 23B shows the state of the data structures after the PLO instruction to perform the chain operation to the front of the dead queue.

FIG. 23A shows the state of the DEAD chain prior to a PLO operation to add an element. The anchor for the DEAD chain 216 points to MSQB 2304. Prior to the PLO operation, MSQB 2302 has had its DEADNEXT pointer set to the address of MSQB 2304. After the PLO operation, the anchor for the DEAD chain 216 points to MSQB 2302. If the PLO operation fails, it is likely because another task has added a dead element to the chain. FIG. 23B shows the state of the control structures after the successful PLO operation.

Message Receive (msgrcv) Recovery

Figure 24A:
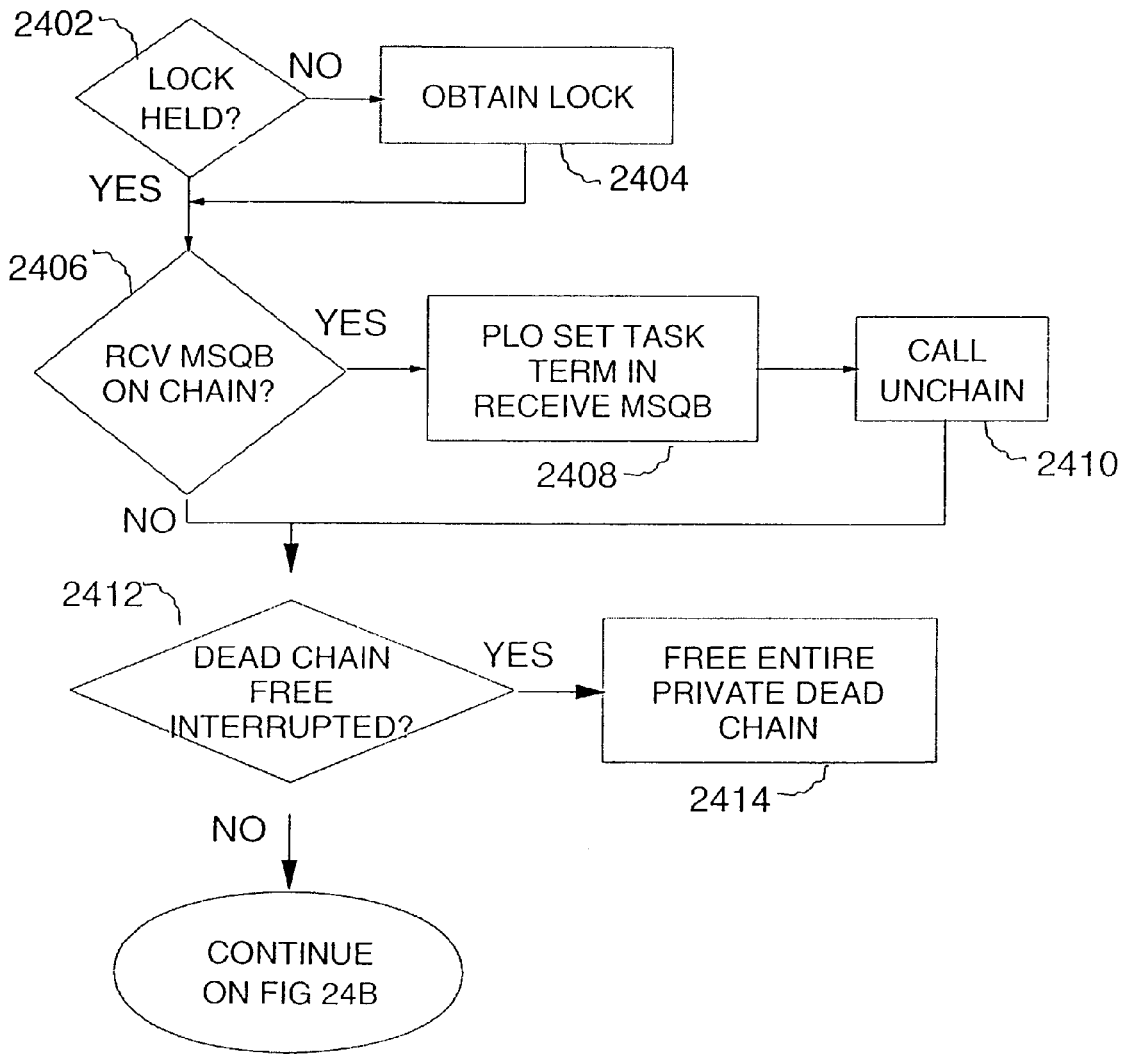
FIGS. 24A and 24B show the recovery of the message receive processing flow.
Figure 24B:
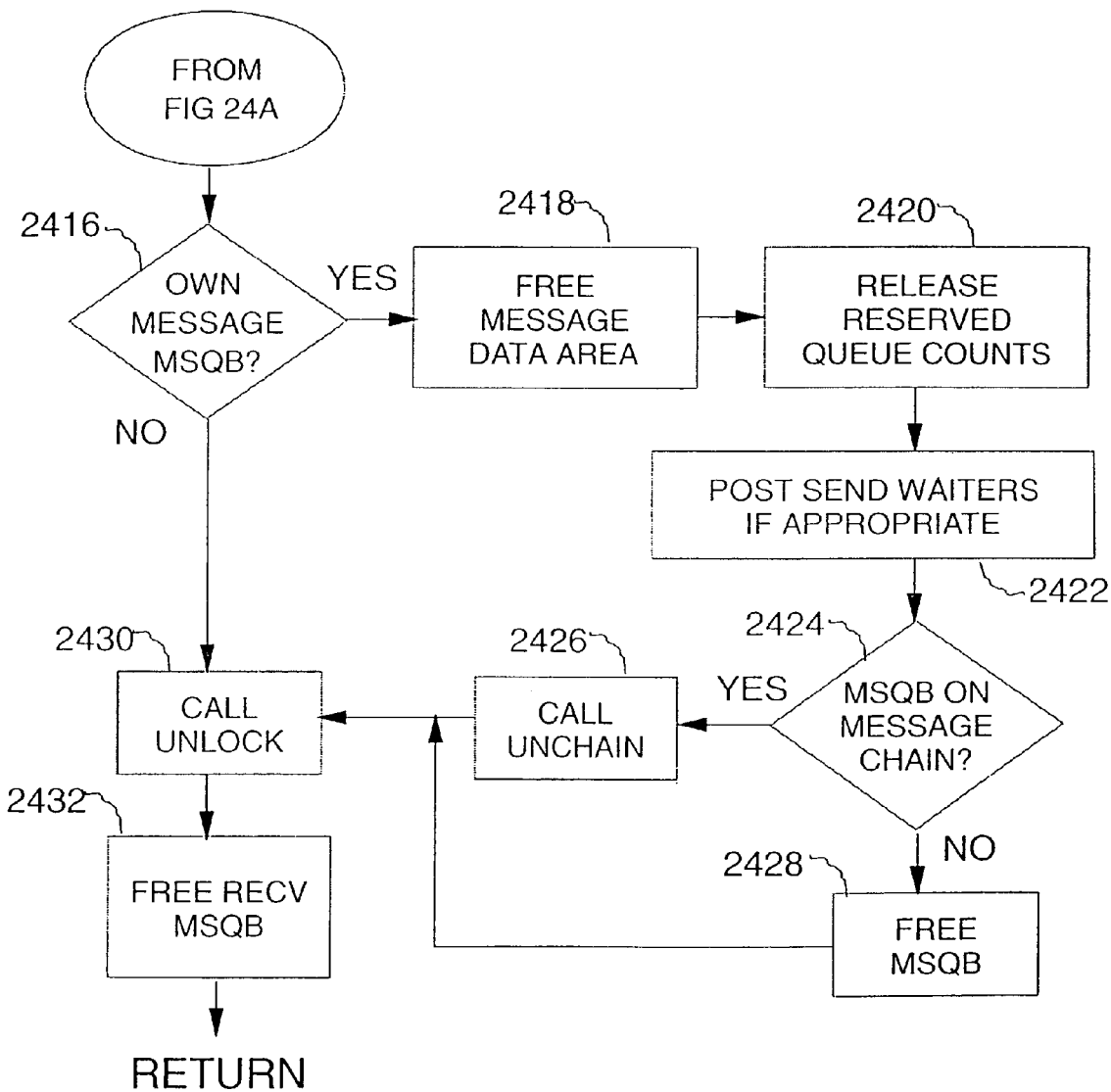

FIGS. 24A and 24B show the high level recovery of the msgrcv processing flow. On input, the receive MSQB is extracted from the recovery anchor located in the task block 402. If the receive MSQB states we are not holding the message queue lock 328 at the time of the error (i.e. we were in a wait), then call LOCK 2404 to obtain it. If the receive MSQB is on the receive chain 326, then attempt by a PLO operation to set the TASKTERM bit within the receive MSQB 2408 to prevent new responsibilities from being assigned (i.e. PAIR 330) to a MSQB that is in recovery, and call UNCHAIN to remove the receive MSQB from the receive chain. If this task was interrupted while it had local dead chain free responsibilities TOBEFREED 334, then loop through the local dead chain to free the dead MSQBs 2414. If a message MSQB is anchored off the receive MSQB 330, then the following activities are performed: (1) the message data area is freed 332 (if allocated); (2) the counts describing queue content 220, 222 are decremented 2420; (3) senders waiting for message queue space are posted 2422 (if appropriate); and (4) if the message MSQB is on the message chain 326 (i.e. msgrcv found the message vs. msgsnd finding a msgrcv MSQB) then call UNCHAIN to remove it 2426, otherwise just free message MSQB 2428. Finally, call UNLOCKIT 2430 and free the receive MSQB 2432.

Message Send (msgsnd) Recovery

Figure 25A:
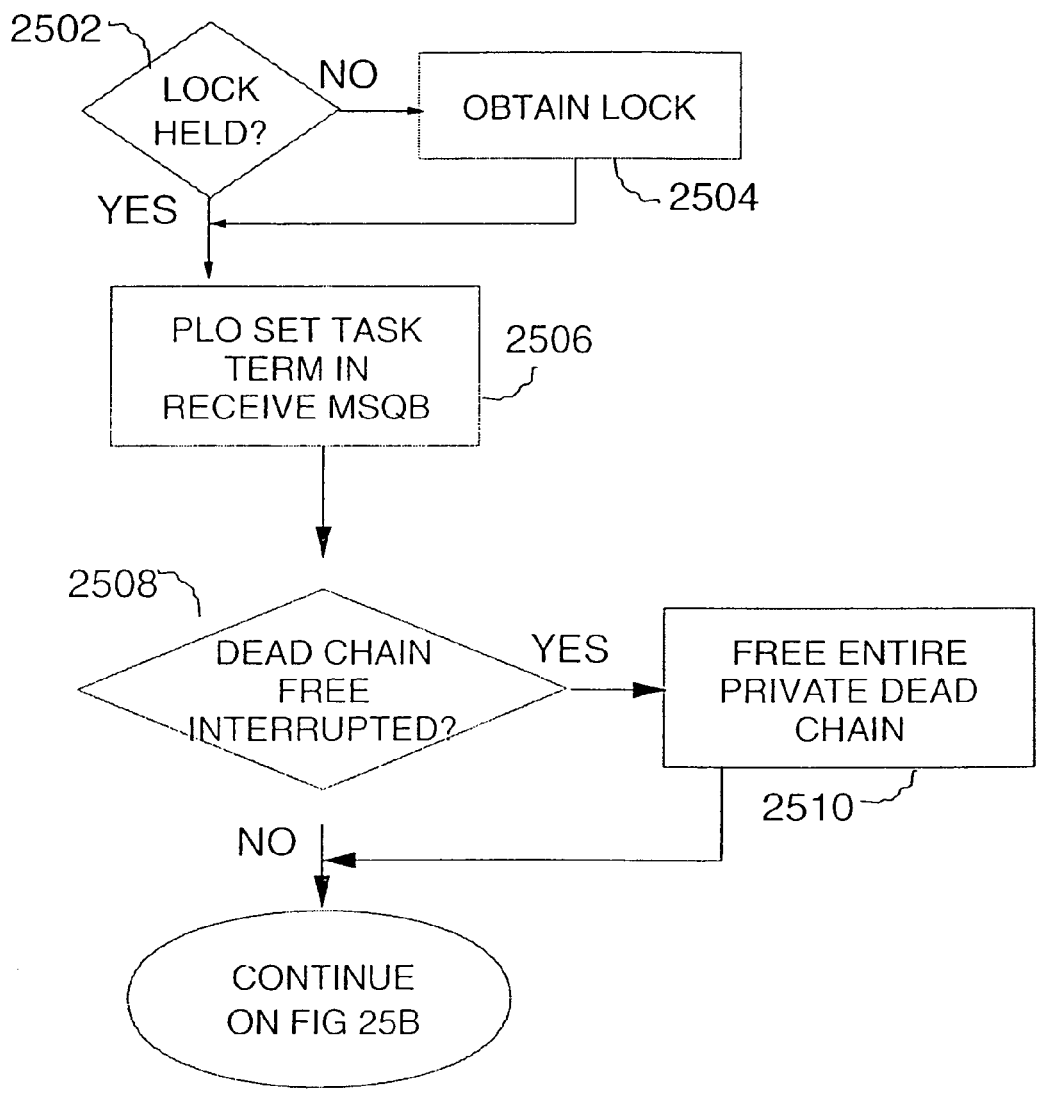
FIGS. 25A and 25B show the recovery of the message send processing flow.
Figure 25B:
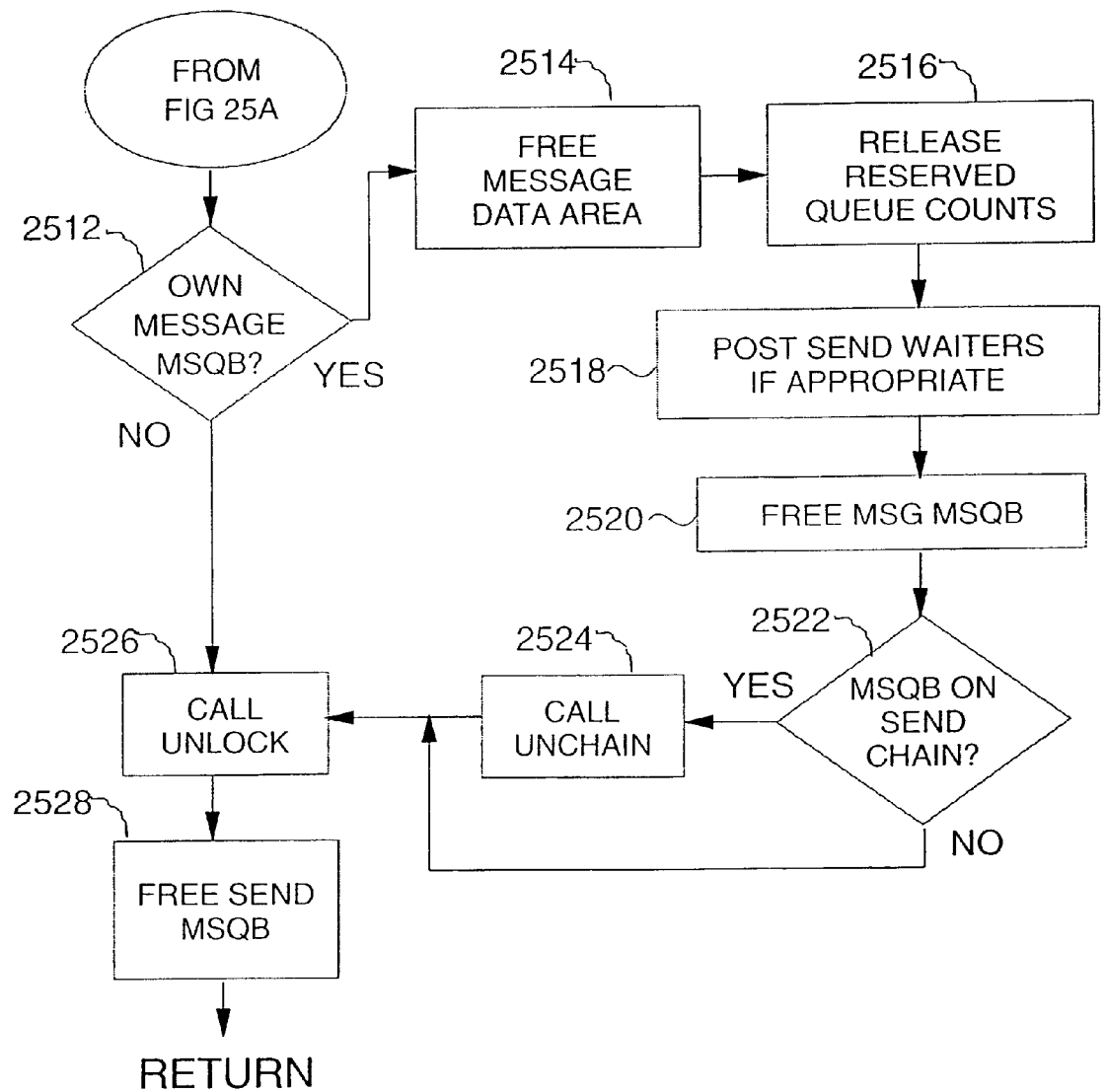

FIGS. 25A and 25B show the high level recovery of the msgsnd processing flow. On input, the send MSQB is extracted from the recovery anchor located in the task block 402. If the send MSQB states we are not holding the message queue lock 328 at the time of the error (i.e. we were in a wait), then call LOCK 2504 to obtain it. Attempt by a PLO operation to set the TASKTERM bit within the send MSQB 2506 to prevent new responsibilities from being assigned to a MSQB that is in recovery. If this task was interrupted while it had local dead chain free responsibilities TOBEFREED 334, then loop through the local dead chain to free the dead MSQBs 2510. If a message MSQB is anchored off the send MSQB 330, then the following activities are performed: (1) the message data area is freed 332 (if allocated); (2) the counts describing queue content 220, 222 is decremented 2516 (if reserved); (3) senders waiting for message queue space are posted 2518 (if appropriate); and (4) the message MSQB is freed 2520. If the send MSQB is on the send chain 326, then call UNCHAIN 2524 to remove it. Finally, call UNLOCKIT 2526 and free the send MSQB 2528.

While a particular embodiment has been shown and described, various modifications and equivalent structures and steps will be apparent to those skilled in the art.

What is claimed is:

1. A method of performing a recoverable operation on a message queue in response to a request by a caller in an information handling system, said method comprising the steps of:
   storing a use count for said message queue indicating a count of tasks accessing said message queue;
   storing a use count flag for said caller indicating whether said caller has acquired a lock on said message queue;
   comparing said use count with a previously read use count; and
   if said use count matches said previously read use count, then, atomically with said comparing step, updating said use count to indicate a new count of tasks accessing said message queue and updating said use count flag to indicate whether said caller has acquired a lock on said message queue, wherein said updating steps are performed by executing a single atomic instruction that updates said use count and, concurrently therewith, updates said use count flag.

2. The method of claim 1 in which said recoverable operation is a locking operation, said step of updating said use count comprising the step of incrementing said use count, said step of updating said use count flag comprising the step of updating said use count flag to indicate that said caller has acquired a lock on said message queue.

3. The method of claim 1 in which said recoverable operation is an unlocking operation, said step of updating said use count comprising the step of decrementing said use count, said step of updating said use count flag comprising the step of updating said use count flag to indicate that said caller has released a lock on said message queue.

4. The method of claim 1 in which said use count is stored in a message queue table having an entry for said message queue.

5. The method of claim 4 in which said message queue table also stores a pointer to said message queue, said method comprising the further step of:
   comparing said pointer with a previously read pointer atomically with said updating steps, said updating steps being performed only if said pointer matches said previously read pointer.

6. The method of claim 4 in which said message queue table also stores an identifier of said message queue.

7. The method of claim 1 in which said use count flag is stored in a control block for said caller.

8. The method of claim 7 in which said control block for said caller also contains an identifier of said message queue.

9. Apparatus for performing a recoverable operation on a message queue in response to a request by a caller in an information handling system, comprising:
   means for storing a use count for said message queue indicating a count of tasks accessing said message queue;
   means for storing a use count flag for said caller indicating whether said caller has acquired a lock on said message queue;
   means for comparing said use count with a previously read use count; and
   means responsive to a successful comparison of said use count with said previously read use count and operating atomically with said comparing means for updating said use count to indicate a new count of tasks accessing said message queue and updating said use count flag to indicate whether said caller has acquired a lock on said message queue, wherein said updating steps are performed by executing a single atomic instruction that updates said use count and, concurrently therewith, updates said use count flag.

10. The method of claim 9 in which said use count is stored in a message queue table having an entry for said message queue, said message queue table also storing a pointer to said message queue, said method comprising the further step of:
    comparing said pointer with a previously read pointer atomically with said updating operations, said updating operations being performed only if said pointer matches said previously read pointer.

11. A program storage device readable by a machine, tangibly embodying a program of instructions executable by the machine to perform method steps for performing a recoverable operation on a message queue in response to a request by a caller in an information handling system, said method steps comprising:
    storing a use count for said message queue indicating a count of tasks accessing said message queue;
    storing a use count flag for said caller indicating whether said caller has acquired a lock on said message queue;
    comparing said use count with a previously read use count; and
    if said use count matches said previously read use count, then, atomically with said comparing step, updating said use count to indicate a new count of tasks accessing said message queue and updating said use count flag to indicate whether said caller has acquired a lock on said message queue, wherein said updating steps are performed by executing a single atomic instruction that updates said use count and, concurrently therewith, updates said use count flag.

12. The program storage device of claim 11 in which said use count is stored in a message queue table having an entry for said message queue, said message queue table also storing a pointer to said message queue, said method steps further comprising:
    comparing said pointer with a previously read pointer atomically with said updating steps, said updating steps being performed only if said pointer matches said previously read pointer.

* * * * *